(12) United States Patent
Cote et al.

(10) Patent No.: US 10,160,679 B2
(45) Date of Patent: Dec. 25, 2018

(54) WASTEWATER TREATMENT WITH PRIMARY TREATMENT AND MBR OR MABR-IFAS REACTOR

(71) Applicant: General Electric Company, Schenectady, NY (US)

(72) Inventors: Pierre Lucien Cote, Dundas (CA); Steven Kristian Pedersen, Burlington (CA); Wajahat Hussain Syed, Burlington (CA); Jeffrey Gerard Peeters, Oakville (CA); Nicholas William H. Adams, Oakville (CA); Youngseck Hong, Oakville (CA); Geert-Henk Koops, Oakville (CA); James John Royston, Burlington (CA)

(73) Assignee: BL Technologies, Inc., Minnetonka, MN (US)

( * ) Notice: Subject to any disclaimer, the term of this patent is extended or adjusted under 35 U.S.C. 154(b) by 171 days.

(21) Appl. No.: 15/126,886

(22) PCT Filed: Mar. 11, 2015

(86) PCT No.: PCT/US2015/019943
§ 371 (c)(1),
(2) Date: Sep. 16, 2016

(87) PCT Pub. No.: WO2015/142586
PCT Pub. Date: Sep. 24, 2015

(65) Prior Publication Data
US 2017/0088449 A1    Mar. 30, 2017

Related U.S. Application Data

(63) Continuation-in-part of application No. PCT/US2014/031321, filed on Mar. 20, 2014.
(Continued)

(51) Int. Cl.
*C02F 3/10*    (2006.01)
*C02F 3/12*    (2006.01)
(Continued)

(52) U.S. Cl.
CPC ............ *C02F 3/1273* (2013.01); *B01D 61/18* (2013.01); *B01D 61/22* (2013.01); *C02F 1/004* (2013.01);
(Continued)

(58) Field of Classification Search
CPC ........ Y02W 10/12; C02F 3/102; C02F 3/208; C02F 3/1273; C02F 3/1268; C02F 1/004; C02F 3/201; B01D 2321/185
(Continued)

(56) References Cited

U.S. PATENT DOCUMENTS

| 4,270,702 A | 6/1981 | Nicholson |
| 5,213,685 A | 5/1993 | Padovan |

(Continued)

FOREIGN PATENT DOCUMENTS

| CN | 203060938 U | 7/2013 |
| EP | 0488520 A1 | 6/1992 |

(Continued)

OTHER PUBLICATIONS

Kummer, DE 4326603, English Abstract. (Year: 1995).*
(Continued)

*Primary Examiner* — Claire A Norris

(57) ABSTRACT

Wastewater is treated though primary treatment of the water by way of a micro-sieve to produce a primary effluent and primary sludge. There is secondary treatment of the primary effluent by way of a membrane bioreactor (MBR) or an integrated fixed film activated sludge (IFAS) reactor to produce a secondary effluent and a waste activated sludge. The micro-sieve may have openings of 250 microns or less,
(Continued)

for example about 150 microns. In a process, a gas transfer membrane is immersed in water. Pressurized air flows into the gas transfer membrane. An exhaust gas is withdrawn from the gas transfer membrane and used to produce bubbles from an aerator immersed in the water.

8 Claims, 24 Drawing Sheets

Related U.S. Application Data

(60) Provisional application No. 62/082,398, filed on Nov. 20, 2014, provisional application No. 61/968,752, filed on Mar. 21, 2014.

(51) Int. Cl.
| | |
|---|---|
| *B01D 61/18* | (2006.01) |
| *C02F 3/20* | (2006.01) |
| *C02F 11/12* | (2006.01) |
| *B01D 61/22* | (2006.01) |
| *C02F 1/00* | (2006.01) |
| *C02F 101/16* | (2006.01) |

(52) U.S. Cl.
CPC ............ *C02F 3/1268* (2013.01); *C02F 3/201* (2013.01); *C02F 11/123* (2013.01); *B01D 2313/26* (2013.01); *B01D 2315/06* (2013.01); *B01D 2315/20* (2013.01); *C02F 2101/16* (2013.01); *C02F 2203/006* (2013.01); *C02F 2303/20* (2013.01); *C02F 2303/24* (2013.01); *Y02W 10/15* (2015.05)

(58) Field of Classification Search
USPC ........................................ 210/150, 615, 620
See application file for complete search history.

(56) References Cited

U.S. PATENT DOCUMENTS

| | | |
|---|---|---|
| 5,910,249 A | 6/1999 | Kopp et al. |
| 7,169,295 B2 | 1/2007 | Husain et al. |
| 2004/0149233 A1 | 8/2004 | Cummins |
| 2010/0126929 A1* | 5/2010 | Husain ................ B01D 63/043 210/610 |
| 2013/0027403 A1 | 1/2013 | Lee et al. |
| 2013/0027411 A1 | 1/2013 | Hebler et al. |
| 2013/0134089 A1 | 5/2013 | Cote |

FOREIGN PATENT DOCUMENTS

| | | |
|---|---|---|
| KR | 101297685 B1 | 8/2013 |
| WO | 9010488 A1 | 9/1990 |
| WO | 9426387 A1 | 11/1994 |
| WO | 0156681 A1 | 8/2001 |
| WO | 2009091260 A1 | 7/2009 |
| WO | 2012105847 A1 | 8/2012 |
| WO | 2012145712 A2 | 10/2012 |
| WO | 2012145763 A2 | 10/2012 |
| WO | 2014130041 A1 | 8/2014 |
| WO | 2014130042 A1 | 8/2014 |
| WO | 2014130043 A1 | 8/2014 |

OTHER PUBLICATIONS

Semmens et al, "COD and nitrogen removal by biofilms growing on gas permeable membranes," Water Research vol. 37, pp. 4343-4350. (Year: 2003).*
International Search Report and Written Opinion issued in connection with Related Application No. PCT/US2014/031321 dated Dec. 19, 2014.

* cited by examiner a) Hollow fibers b) Conceptual membrane cord c) Cross-section of membrane cord d) Longitudinal view of membrane cord e)

a) Oxygen flux and transfer efficiency b) Dissolved oxygen a) Based on ammonia and nitrate mass balance b) Based on nitrate mass balance in each of the 3 tanks a) CAS Biological Treatment b) Hybrid MABR Biological Treatment

WASTEWATER TREATMENT WITH PRIMARY TREATMENT AND MBR OR MABR-IFAS REACTOR

CROSS-REFERENCE TO RELATED APPLICATIONS

This application is a national stage application under 35 U.S.C. § 371(c) of prior filed, PCT application PCT/US2015/019943, filed Mar. 11, 2015 which claims priority to U.S. provisional application 61/968,752, titled "WASTEWATER TREATMENT WITH PRIMARY TREATMENT AND MBR OR MABR-IFAS REACTOR", filed on Mar. 21, 2014; U.S. provisional application 62/082,398, titled "MEMBRANE-AERATED BIOFILM REACTOR (MABR) FOR WASTEWATER TREATMENT, filed on Nov. 20, 2014; and is a continuation-in-part of, US WIPO (PCT) application US2014/031321 filed on Mar. 20, 2014. The above-listed applications are herein incorporated by reference.

FIELD

Embodiments of the invention relate to wastewater treatment, primary treatment with a micro-sieve, membrane bioreactors and membrane biofilm reactors.

BACKGROUND

A conventional activated sludge wastewater treatment system has a primary clarifier followed by one or more tanks in which mixed liquor is maintained under aerobic, anoxic or anaerobic conditions. Mixed liquor leaving these tanks is separated in a second clarifier to produce an effluent and activated sludge. Some of the activated sludge is returned to the process tanks. In some plants, the remainder of the activated sludge is thickened and then sent to an anaerobic digester with sludge from the primary clarifier. In some cases, the second clarifier is replaced with a membrane separation unit to produce a membrane bioreactor (MBR).

US publication 2013/0134089 A1 describes a wastewater treatment process that uses enhanced primary treatment to remove suspended solids from raw wastewater. Primary sludge is treated in a fermenter. Primary effluent is treated by biological nutrient removal to produce a treated effluent and waste activated sludge (WAS). The WAS is treated in an anaerobic digester, which also treats sludge from the fermenter.

In a membrane biofilm reactor (MBfR), a membrane is used both to support a biofilm and to transport a gas to the biofilm. Membrane-aerated biofilm reactors (MABR) are a subset of MBfRs in which an oxygen-containing gas is used. U.S. Pat. No. 7,169,295 describes a membrane supported biofilm film reactor with modules having fine hollow fiber membranes used in tows or formed into a fabric.

BRIEF DESCRIPTION

The specification describes a wastewater treatment process with primary treatment provided by a microsieve, such as a rotating belt sieve (RBS). Secondary treatment may be provided using a suspended biomass, a membrane supported biomass, or both. In a process, at least a portion of waste sludge, comprising either formerly suspended biomass or formerly membrane supported biomass or both, is treated through the micro-sieve.

The RBS can have a performance equal to or better than primary clarifiers, in terms for example of total suspended solids (TSS) or chemical oxygen demand (COD) removal. However, an RBS might only occupy, for example, $1/10^{th}$ of the footprint of a conventional primary clarifier. An RBS can provide diversion of organics from biological treatment resulting, in an example, in smaller biological reactors (−38%) and lower oxygen requirements (−25%) when compared to a conventional membrane bioreactor (MBR). Furthermore, RBS technology offers options for sludge handling: primary solids can be dewatered within the unit, for example to 20-30% TSS, or waste sludge can be co-thickened with the primary sludge, for example to >10% TSS.

An RBS unit was evaluated over one year with municipal wastewater. Three different belt opening sizes (750, 350 and 154 μm) had a median removal of TSS of 49%, 66% and 72%, respectively; COD removal was 16%, 30% and 39%, respectively.

In some examples, the RBS or another micro-sieve is used to provide primary treatment for an MBR. The use of RBS with MBR can, in some cases, present benefits over primary clarifiers, for example one or more of: i) smaller plant footprint, ii) elimination of fine screening, iii) volume reduction of residual solids, and iv) better protection of the filtration membranes.

In some examples, the RBS or another micro-sieve is used with a membrane-aerated biofilm reactor (MABR). In the MABR, a gas transfer membrane is used to support and aerate a fixed biofilm. In an exemplary process, the gas transfer membranes support a primarily aerobic biofilm, optionally with an anoxic layer. Additional anoxic microorganisms are provided in a tank with the gas transfer membranes, but without these additional microorganisms being supported on the membranes.

In some examples, the RBS (or another micro-sieve) or an MABR, or both in some embodiments, is used with a low energy or energy-neutral flowsheet for municipal wastewater treatment. An exemplary flowsheet is based on a hybrid suspended-growth and membrane-aerated biofilm reactor (MABR) process. This flowsheet can achieve, under some circumstances, energy-neutrality (possibly even better, electricity-neutrality) while removing nitrogen using the nitrification-denitrification metabolic pathway, and is compatible with solid-liquid separation by conventional clarification or membrane filtration. The new flowsheet was compared to a conventional activated sludge (CAS) flowsheet including complete wastewater and sludge treatment with anaerobic digestion and combined heat and power production. In this example, the new flowsheet has an electricity consumption 30% lower and energy production 18% higher as compared to the CAS flowsheet and was overall electricity-neutral.

This specification also describes a gas transfer membrane which, optionally, may be used in an MABR as described above. The gas transfer membrane is based on a "cord" which is made up of multiple oxygen diffusion hollow fibers and reinforcing filaments and supports the development of a biofilm. In an example, a core is made up of generally longitudinal reinforcing filaments, optionally braided, surrounded by radially spaced longitudinally extending gas transfer membranes, surrounded by one or more layers of spiral wrapped reinforcing filaments.

The performance of an exemplary new membrane as described above was evaluated in clean water re-aeration tests, in a 250-day nitrification test using a synthetic feed solution, and treating primary effluent. Under high ammonia loading conditions, the oxygen flux reached 90-100 g $O_2$/d/ km cord (≈20 g $O_2$/d/m² biofilm), while the nitrification rate exceeded 16 g $NH_4$—N/d/km cord (≈3.5 g $O_2$/d/m² biofilm). The process achieved 99% ammonia removal at a hydraulic retention time of 2.5 hours.

An MABR optionally uses hollow fiber membranes arranged in modules and cassettes deployed in a way similar to immersed hollow fiber filtration membranes used for MBR (e.g.: the ZeeWeed™ 500 product by GE Water & Process Technologies). Atmospheric air is fed down the lumen of hollow fibers and oxygen is transferred to the biofilm growing on the outer surface of the membrane without the formation of bubbles. The MABR can achieve aeration efficiency greater than 6 kg $O_2$/kWh using air as feed, at an oxygen transfer efficiency of 60%. The MABR can be used in an aerobic biological treatment process that, under some conditions, consumes four times less energy than fine bubble aeration.

This specification also describes a process in which a gas transfer membrane is immersed in water. Pressurized air flows into the gas transfer membrane. An exhaust gas is withdrawn from the gas transfer membrane and used to produce bubbles, alone or with added ambient air, from an aerator immersed in the water. The exhaust gas has a pressure larger than the static head of water above the aerator. A biofilm may be supported on the gas transfer membrane and oxygen transferred to the biofilm through the gas transfer membrane. A suspended biomass may also be provided in the water.

This specification also describes a process and apparatus for treating water having primary treatment of the water by way of a micro-sieve to produce a primary effluent and primary sludge. There is secondary treatment of the primary effluent by way of a membrane bioreactor (MBR) or an integrated fixed film activated sludge (IFAS) reactor to produce a secondary effluent and a waste activated sludge. The micro-sieve may have openings of 250 microns or less, for example about 150 microns. The opening size maybe determined by one or more of the nominal size specified by a manufacturer, the larger of the length and width or a rectangular or square opening, or the diameter of a circle of equivalent area for openings of other shapes.

Waste sludge may be co-thickened with the primary sludge, optionally through the micro-sieve, and sent to an anaerobic digester. In the case of an MBR, fine screening is not required. In the case of an IFAS, the fixed film may be supported on a gas permeable membrane. The IFAS reactor may be operated without nitrate recycle and at a solids retention time of 10 days or less.

DETAILED DESCRIPTION

Primary Treatment for MBR

The use of membrane bioreactor (MBR) technology for municipal wastewater treatment has grown significantly in the past decade, driven by their ability to reliably produce a high quality effluent in a small footprint. However, the operating costs remain greater for an MBR, mostly due to higher energy consumption. Progress towards the goal of energy-neutrality can involve one or both of reducing consumption and recovering the energy contained in the wastewater.

Early MBR plants where small, driving the design towards extended aeration with a high mixed liquor suspended solids concentration, and a long sludge retention time. This approach met the goals of a small footprint plant, low sludge production and high effluent quality.

MBR technology is now considered for small and large plants and the design philosophy has evolved as plant size has increased. With larger conventional plants, the approach to reduce energy consumption is to add primary clarification to reduce the load to biological treatment and shunt organic matter to solids treatment (e.g., anaerobic digestion). However, primary clarification has a large footprint and negates a key benefit of MBR.

This specification describes primary treatment process based on a micro-sieve, such as a rotating belt sieve (RBS). An RBS-MBR process helps address the energy challenge by significantly reducing the loading to secondary biological treatment. In addition, the residuals produced by the RBS are rich in organics and can be used in anaerobic digestion or other solids treatment to enhance the conversion of carbon to energy.

Figure 1:
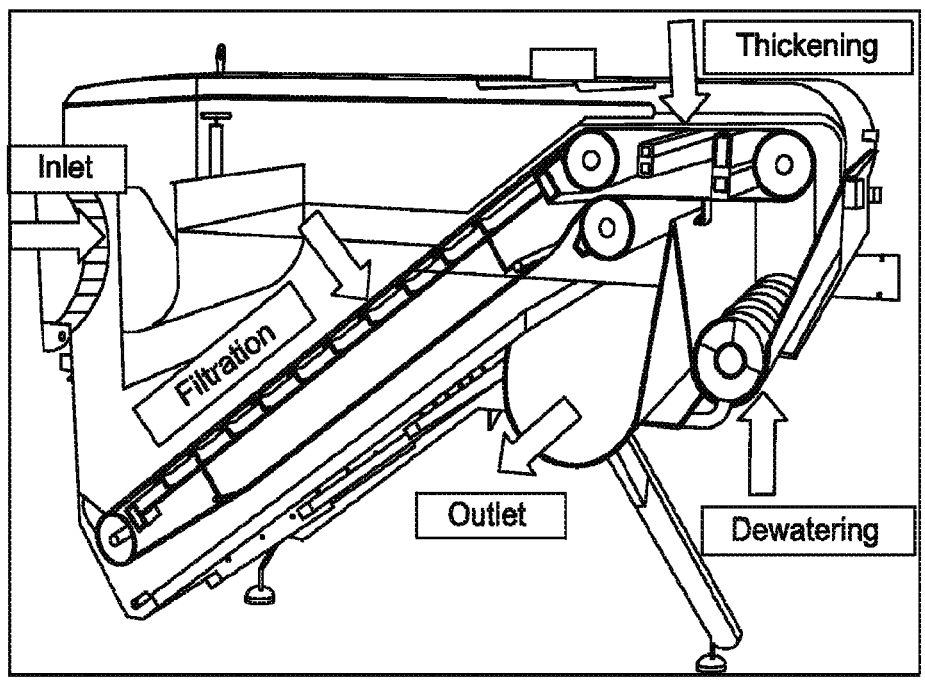
FIG. 1 is a schematic cross section showing the key functions of a rotating belt sieve.

A rotating belt sieve (RBS) is an advanced primary treatment device that combines separation, thickening and dewatering of primary solids in a single compact unit (FIG. 1).

An exemplary RBS has a continuous fine sieve belt contained in a stainless steel housing or mounted in a concrete channel, which filters incoming wastewater under a small hydraulic head. The belt is mounted on rollers that can continuously or intermittently be rotated to transport the retained suspended solids to a thickening zone and further drop them into a dewatering auger.

The sieve openings can be selected within a range of 50 to 2,000 μm based on influent characteristics and removal requirements; the typical opening for municipal wastewater is 350 μm. However, in an embodiment, a smaller opening size may be beneficial, for example 250 microns or less or 154 microns (about 150 microns).

The RBS equipment is constructed as modular units. Some units are made and sold by Salsnes. LEAPprimary™ units are or will be available from GE Water and Process Technologies in four sizes with a range of nominal flow rate between 60-550 m³/h (Table 1). Nominal flow rates in Table 1 are indicative only and provided for a typical municipal wastewater application with TSS of 250 mg/L and sieve openings of 350 μm. They are based on a hydraulic loading rate (HLR) of 250 m/h calculated with the surface area of the belt submerged in the incoming wastewater. Unlike filtration membranes, the performance of RBS is not a function of temperature.

TABLE 1

Rotating belt sieves sizes

| Model | Equipment Footprint m² | Submerged Area m² | Nominal Flow Rate m³/h | Nominal Flow Rate MGD |
|---|---|---|---|---|
| LP10 | 1.9 | 0.25 | 60 | 0.3 |
| LP20 | 3.8 | 0.50 | 125 | 0.8 |
| LP40 | 5.3 | 1.0 | 250 | 1.6 |
| LP60 | 7.3 | 2.2 | 550 | 3.4 |

The water level difference across the belt determines the driving force for sieving and can reach a maximum value of 400 mm of water head. A control system rotates the belt based on a level sensor located on the inlet side of the belt. In an embodiment, the mode of operation is to work with a fully submerged belt and vary the rotation speed based on pressure loss across the belt. This ensures that a cake forms on the belt to enhance removal of fine solids and COD.

The belt traveling time in air (FIG. 1) allows solids to thicken, typically to a concentration of 4-6% but optionally up to 10% or more. Thickened solids drop onto an auger, which moves the solids into the dewatering box where the TSS concentration can further be increased above 10%, for example to 20-30%, without chemical addition. If the higher solids concentration is not desirable (e.g., for subsequent treatment in anaerobic digestion), the dewatering box can be removed and the auger will simply push the solids out of the unit.

The RBS has a mechanism to enhance cake release and cleaning of the belt when it travels above the auger. This is accomplished with an air knife. The RBS is also equipped with a hot water spray that can be used periodically to remove attached particles and fat, oil and grease. Particularly when using screens with openings less than 350 microns, cleaning is augmented with one or more of steam, water droplets (mist) or cleaning agents, as described in PCT/US2014/31321, Method and Apparatus for Cleaning a Rotating Belt Sieve filed on Mar. 20, 2014 by General Electric Company, which is incorporated by reference.

When used as enhanced primary treatment for an MBR plant, rotating belt sieves might offer one or more of the following potential benefits: a) small footprint, approximately 90% smaller than that required for primary clarifiers; b) the ability to control removal rate of suspended solids and organic matter through the selection of sieve openings and mode of operation; d) residual sludge dewatering, with optional co-thickening of waste activated solids (WAS) for further on-site or off-site treatment; and e) removal of trash for better protection of the membranes than provided by conventional fine screening. For co-thickening, the WAS is added to the RBS upstream of the belt, but optionally the WAS can bypass the belt and flow directly into the auger to be thickened in the dewatering box. When the WAS is added upstream of the belt, it may be thickened on the belt, for example to 6 to 12% solids, and further thickening in the dewatering box is optional but often not required and in some cases not desirable. Water released in the dewatering box (if any) is recycled so as to pass through the belt again, but may also be passed on to the next process step with the primary effluent.

An RBS was fed with degritted wastewater from a municipal wastewater treatment plant, which treats a mix of domestic and light industrial wastewater. Over the testing period, the feed was characterized through 55 pairs of 24-hour composite samples. Feed composition based on the composite samples is reported in Table 2. Median TSS and COD were 280 mg/L and 540 mg/L, respectively, both parameters varying within a broad range. In addition to composite samples, pairs of grab samples were taken through the same period to evaluate the RBS performance under specific operating conditions.

TABLE 2

Feed wastewater composition through the testing period

|  | TSS (mg/L) | COD (mg/L) |
|---|---|---|
| Pairs of composite samples | 55 | 55 |
| Average | 325 | 565 |
| Median | 280 | 540 |
| Minimum | 138 | 246 |
| Maximum | 981 | 1,374 |

The RBS equipment used in the study was a LEAPprimary model LP10 (Table 1). A portion of the belt area was intentionally blinded with a plastic material to reduce flow rate due to feed flow rate limitation. The mode of operation involved running the belt at a constant submerged area of 0.06 m² (used to calculate the hydraulic loading rate) and advancing the belt when the level sensor reached a maximum value.

Figure 2:
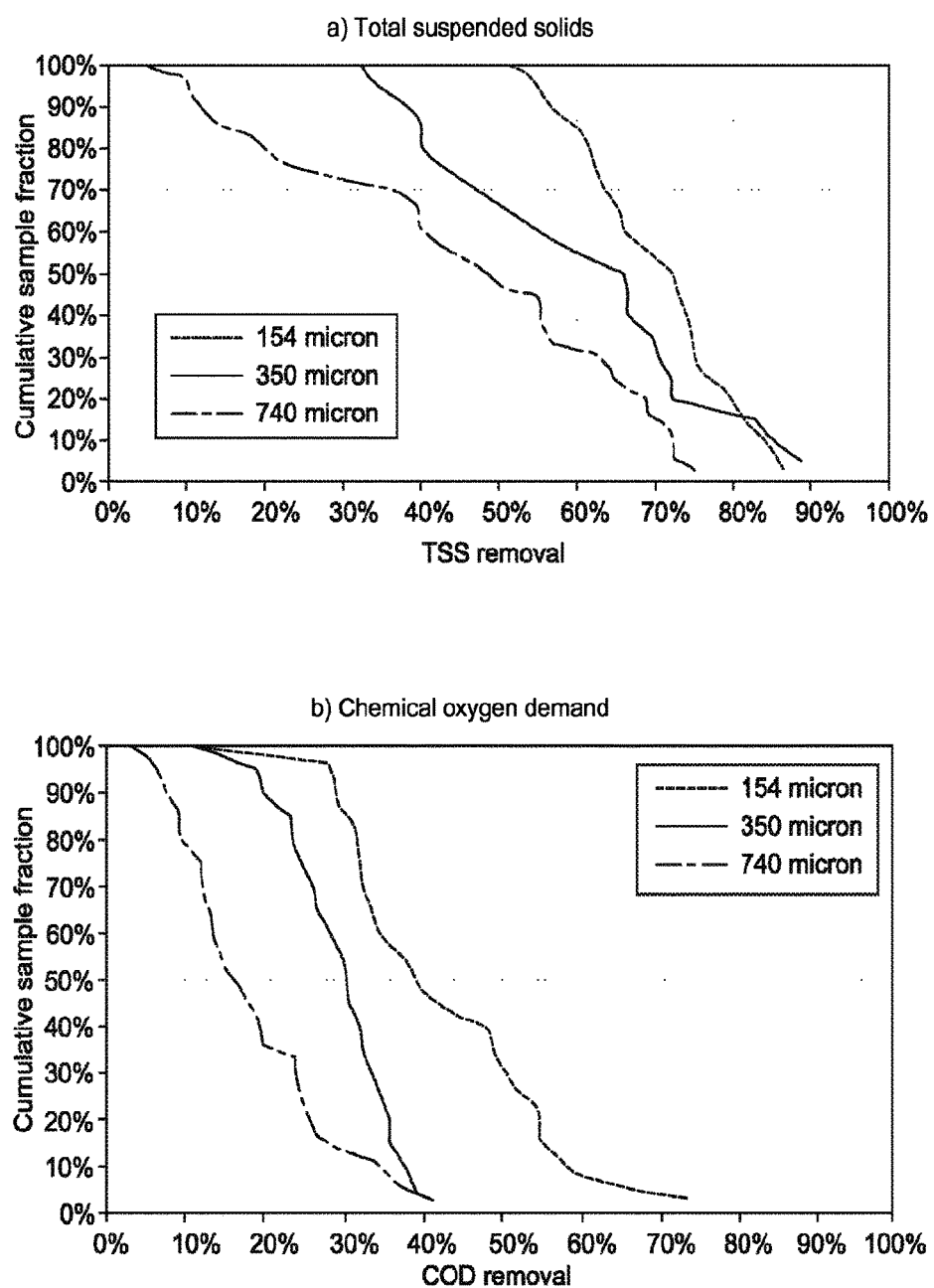
FIG. 2 contains graphs of cumulative removal distribution results in tests of a rotating belt sieve.

Three different belts with openings of 154, 350 and 740 μm were evaluated at hydraulic loading rates ranging between 75 and 250 m/h and solids loading rate from 10 to over 100 kg/m²/h. Removal of TSS and COD are presented in FIG. 2 as cumulative distribution functions. Relevant data are extracted in Table 3. In FIG. 2, the cumulative sample fraction (Y axis) represents the fraction of data points that had a removal larger than the value read on the X axis. As an example, for TSS removal with the 350 μm belt, 100% of the data points had a removal >32%, the 50% sample (the median) had a removal of 66% and the maximum removal observed was 89%.

TSS and COD removal increased with smaller sieve openings, even though all three belts were operated with matting (i.e., with a fully submerged belt). For the 350 μm belt, the TSS and COD median removal were 66% and 30%, respectively; these values increased to 72% and 39% with the 154 μm belt. With the 740 μm belt, the removal range for TSS was broader and the median removal of COD was only 16%.

TABLE 3

Summary of removal rates

|  | TSS Removal | | | COD Removal | | |
| --- | --- | --- | --- | --- | --- | --- |
| Sieve Opening Size (μm) | 154 | 350 | 740 | 154 | 350 | 740 |
| Number of data points | 30 | 20 | 36 | 30 | 20 | 36 |
| Minimum | 55% | 32% | 10% | 10% | 12% | 3% |
| Median | 72% | 66% | 49% | 39% | 30% | 16% |
| Maximum | 86% | 89% | 75% | 73% | 37% | 41% |

Figure 3:
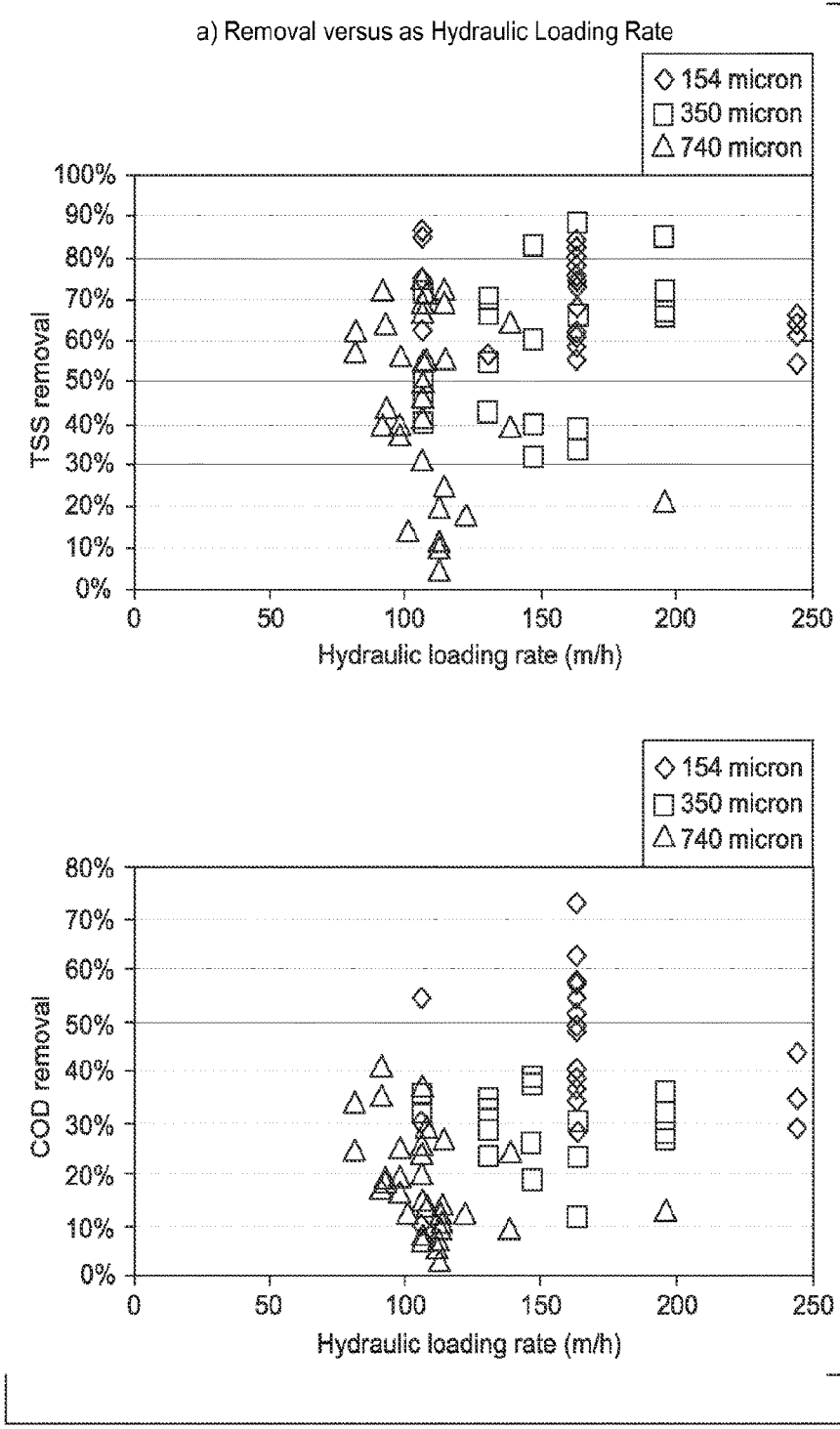
FIG. 3 contains graphs of removal as a function of hydraulic and solids loading rates in tests of a rotating belt sieve.
Figure 3:
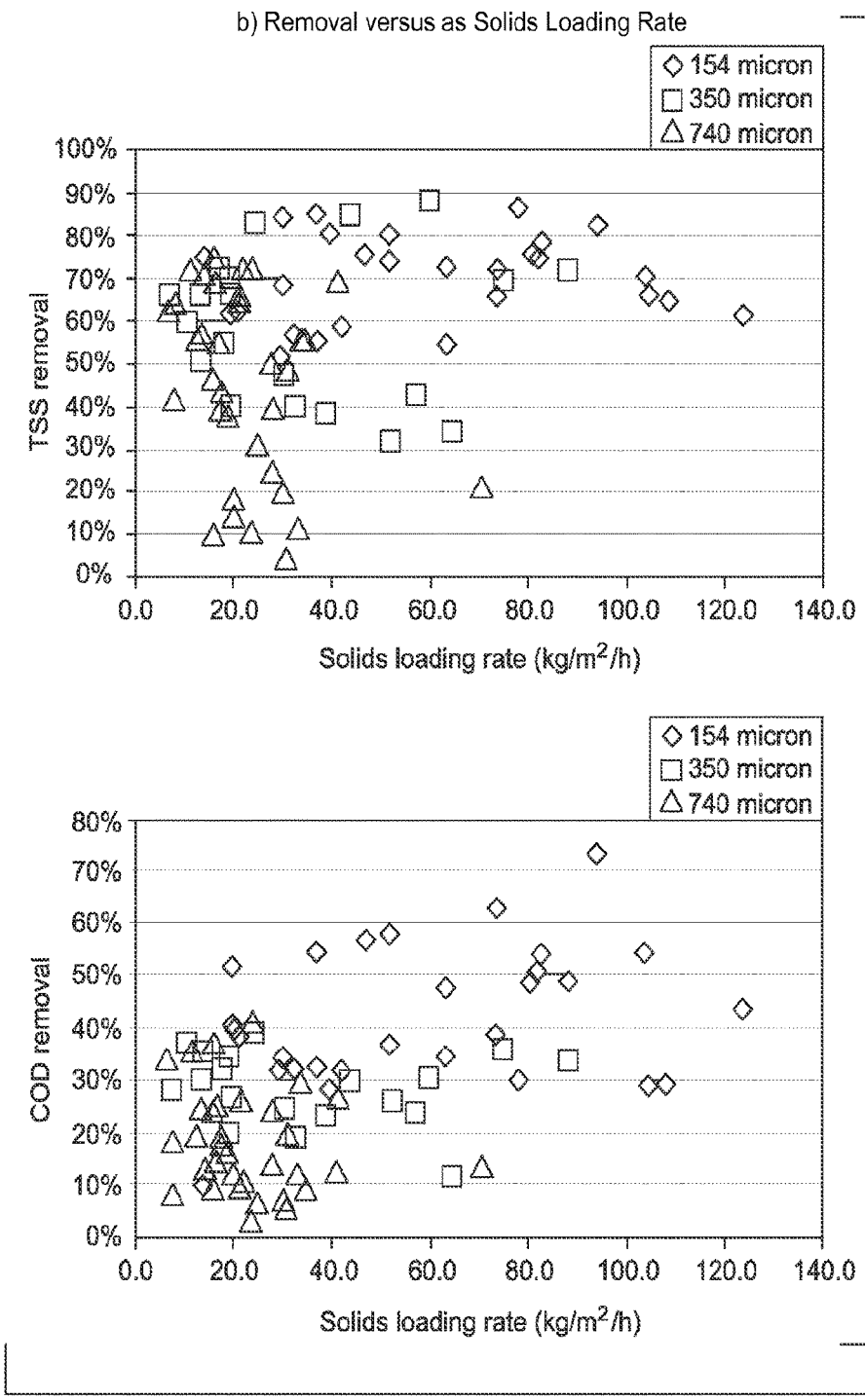

All the data points used to build FIG. 2 were plotted in FIG. 3 to estimate the potential impact of the hydraulic loading rate (HLR) and the solids loading rate (SLR) on performance. FIG. 3a shows that most of the data points were collected with the RBS running at HLR within 100 to 150 m/h to represent average day flow conditions; several samples were also collected at HLR of 245 m/h to represent peak hour flow conditions. There appears to be no impact of HLR on the removal of TSS or COD. The broad range of removal observed for each belt openings is therefore related to wastewater variability (i.e., given the significant and variable industrial wastewater contribution).

The solids loading rate (SLR) plotted in FIG. 3b was calculated by multiplying the HLR by the feed TSS. SLR varied within an order of magnitude, from about 10 to over 100 kg/m$^2$/h. There was no impact of SLR on TSS removal. For COD, there was a visible impact of SLR only with the smaller belt openings of 154 μm.

The equipment controls provide flexibility to vary TSS and COD removal by changing the belt rotation speed. For instance, rotation can be slowed down to maximize cake formation and removal, or speeded up to allow more COD to flow through if required for denitrification.

When used for primary treatment to an MBR, RBS technology replaces primary clarification and fine screening. An experiment was conducted using a pilot MBR treating an influent screened with a 3 mm fine screen. The MBR was run at an HRT of 4.5 hours and SRT of 15 days. Based on a mass balance around the MBR, the trash content of the mixed liquor is equal to the trash content of the influent multiplied by the ratio SRT/HRT (in this case, a concentration factor of 80). The trash content of the mixed liquor was measured with a 1 mm manual sieve of the type used for soil classification. The trash content on day zero of the RBS experiment was equal to 66.7 mg/L, representing steady-state conditions. At that point in time, the feed to the MBR was switched from the 3 mm fine screen to the RBS effluent. The trash content dropped to 0.23 mg/L within 55 days (approximately 3 SRTs). After 69 days, the trash content dropped to an undetectable level. During the test period, different belts were evaluated, but the openings were always smaller or equal to 350 μm. Therefore, the RBS effectively removed essentially all trash from the MBR feed.

Figure 4:
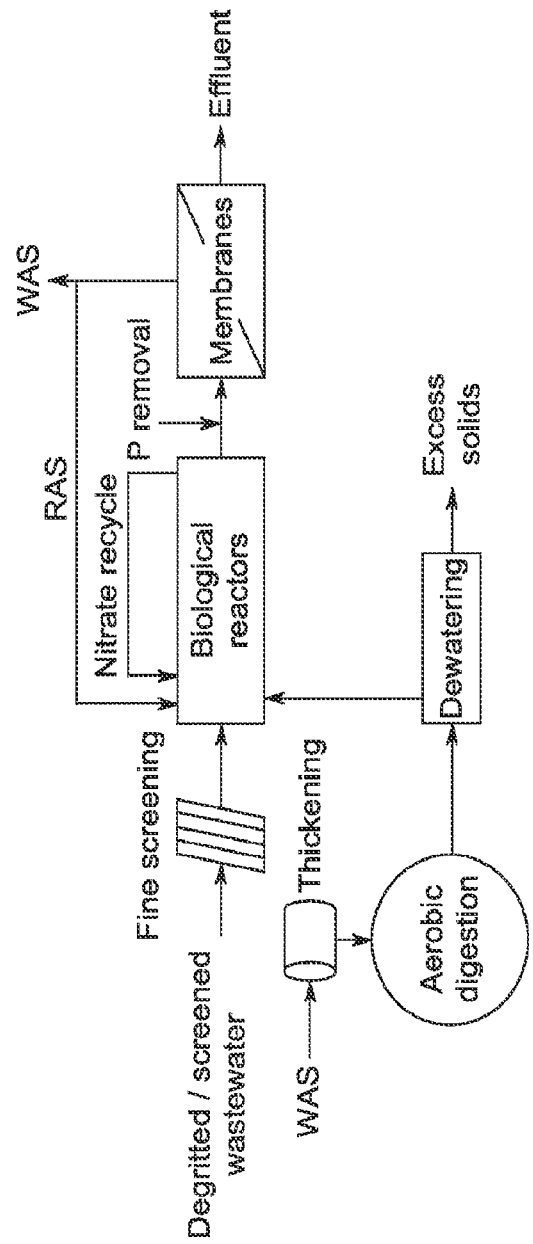
FIG. 4 contains schematic drawings of comparative MBR flowsheets.
Figure 4:
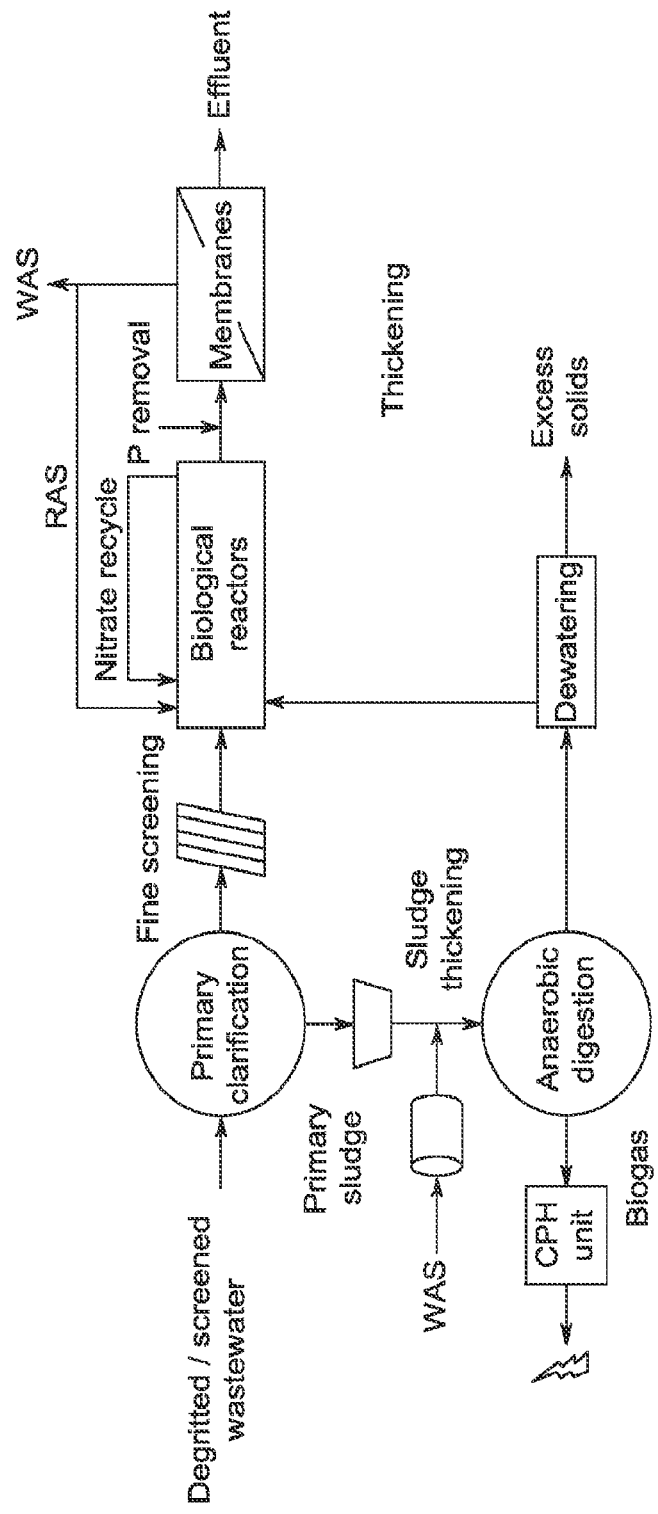
Figure 4:
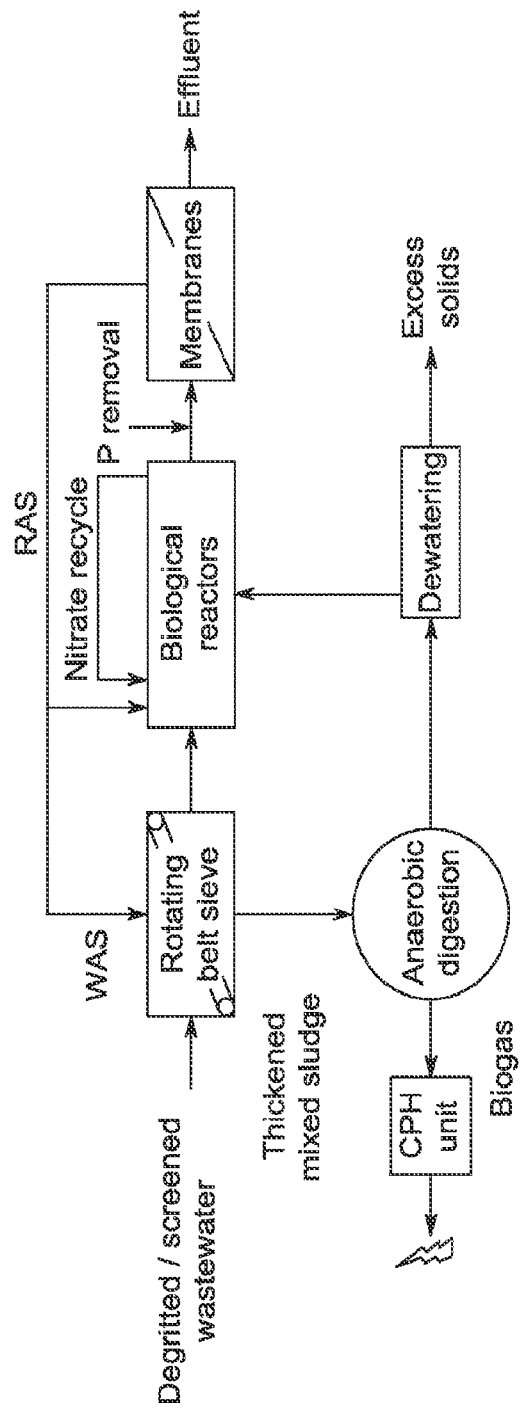

Three complete wastewater treatment flowsheets including sludge treatment were compared (FIG. 4). The first flowsheet called "MBR" (FIG. 4a) is representative of an early generation MBR: it has no primary treatment and thickened WAS is digested aerobically. The second flowsheet called "PC+MBR" (FIG. 4b) includes conventional primary clarification, primary sludge and WAS thickening, and anaerobic digestion. The third flowsheet called RBS+MBR (FIG. 4c) includes an RBS to replace primary clarification and fine screening, and is used for co-thickening of primary solids and WAS; like PC+MBR, it has anaerobic digestion.

Each flowsheet was evaluated for a plant with an average daily flow of 18,925 m$^3$/d (5 MGD) and the following influent characteristics: BOD/SS/TN/TP=220/220/40/7 mg/L. It was assumed that the peak hourly flow was two times the average daily flow, the monthly loading peak was 1.35 times average and the winter design temperature was 12° C. The target effluent characteristics were BOD/SS/TN/TP=15/15/10/1.0 mg/L; all three plants were designed to fully nitrify.

The process design of the three plants was simulated with GPS-X (Hydromantis Inc.) using default parameters to obtain treatment efficiency, sludge production and the sizing of reactors. HRT and SRT of the biological processes were adjusted to meet the target effluent characteristics stated above. The plant design philosophy and sizing of equipment were consistent with previous work (Young T. et al, "MBR vs. CAS: Capital and Operating Cost Evaluation", Water Practice & Technology, 7(4), 2013). Electricity requirements were estimated using the methodology described in Côté P. et al, "Membrane Bioreactors are not Energy Hogs", Water Environment & Technology 25(11), 2013).

The unit operations for the three flowsheets are described in Table 4. It was assumed that all three plants received a coarse screened (6 mm), degritted wastewater. The PC-MBR flowsheet still required fine screening to protect the membranes; the RBS-MBR did not. The removal efficiency through primary treatment for the PC+MBR and the RBS+MBR flowsheets was assumed to be the same to facilitate the comparison.

The biological treatment for all three flowsheets was designed with a 17 day SRT to fully nitrify at the design temperature of 12° C. The MBR plant required 8,200 m$^3$ of reactor volume and the oxygen transfer rate (OTR) was 4,872 kg/d. For the PC+MBR and the RBS+MBR plants, primary treatment allowed reduction of the reactor volume and the OTR by 38% and 25%, respectively. The diversion of organics through primary treatment for flowsheets PC+MBR and RBS+MBR resulted in a significant increase in methanol demand for denitrification; in practice, this demand could be reduce by generating volatile fatty acids through fermentation of the primary sludge. In addition, RBS offer more flexibility than primary clarification to target a favorable carbon to nitrogen ratio for denitrification.

With the PC+MBR and RBS+MBR flowsheets, sludge production was increased by 21% over the MBR flowsheet, due to the reduced mineralization of organics in secondary treatment. Furthermore, the sludge was more organic, with a VSS/TSS ratio of 68% versus 60% for the MBR flowsheet.

TABLE 4

Selected process results

| Parameter | MBR | PC + MBR | RBS + MBR |
| --- | --- | --- | --- |
| Primary Treatment | | | |
| Fine screening | 2 mm screening | 2 mm screening | None |
| Primary treatment | None | Primary clarification | Rotating belt sieve |

TABLE 4-continued

Selected process results

| Parameter | MBR | PC + MBR | RBS + MBR |
|---|---|---|---|
| TSS/COD removal, % | 0% | 60%/37% | 60%/37% |
| Chemical phosphorus removal | Alum | Alum | Alum |
| Biological Treatment | | | |
| HRT of biological reactors, h | 10.4 | 6.5 | 6.5 |
| Bioreactor volume, m³ | 8,200 | 5,100 | 5,100 |
| SRT of biological reactors, d | 17.0 | 17.0 | 17.0 |
| MLSS concentration, g/L | 6.0 | 6.0 | 6.0 |
| NO₃ recycle rate (multiple of influent flow) | 4.0 Q | 4.0 Q | 4.0 Q |
| RAS (multiple of influent flow) | 4.0 Q | 3.0 Q | 3.0 Q |
| Aeration method | Fine bubbles | Fine bubbles | Fine bubbles |
| Total oxygen transfer rate, kg/d | 4,872 | 3,672 | 3,672 |
| Carbon addition for denitrification, L/d | 100 (methanol) | 600 (methanol) | 600 (methanol) |
| Sludge Treatment | | | |
| Primary sludge, kg/d | 0 | 2,500 | 2,500 |
| Waste activated sludge, kg/d | 3,500 | 1,750 | 1,750 |
| Total sludge, kg/d | 3,500 | 4,250 | 4,250 |
| Total sludge VSS/TSS | 60% | 68% | 68% |
| Total sludge TSS, g/L | 6.5% | 7.2% | 10.0% |
| Primary sludge thickening method | None | Gravity thickener | RBS |
| WAS thickening method | Rotary drum | Rotary drum | RBS co-thickening |
| Sludge digestion method | Aerobic | Anaerobic | Anaerobic |
| Sludge digestion HRT, d | 25 | 25 | 25 |
| Digester volume, m³ | 1,550 | 1,400 | 1,000 |
| Volatile solids reduction, % | 30% | 59% | 59% |
| Biogas production, m³/d | None | 1,500 | 1,500 |
| Energy recovery | | | |
| Biogas conversion to electricity, % | | 35% | 35% |

The MBR and PC+MBR flowsheets employed conventional thickening processes (gravity thickener for primary sludge and rotary drum screen for WAS) that brought the mixed sludge to a concentration of approximately 7.0% TSS. For the RBS+MBR flowsheet, it was assumed that the RBS could be used to co-thicken the WAS with primary sludge to 10% without polymers, a concentration at which the sludge is still pumpable. This is a conservative assumption considering that Neef et al (2012) were able to obtain 29% TSS. The WAS is returned to the RBS upstream of the belt. Thickening of the primary sludge and WAS occurs while the belt travels through air before the air knife. Optionally, additional thickening can occur in the auger and dewatering box, but this is not always desirable. The WAS may be mixed with the influent anywhere upstream of the belt. Alternatively, the WAS may be added behind a partition intended to allow influent wastewater to contact the belt first. Such a partition is shown in Neef et al (2012) (Neef, R., Bult, B. and van Opijnen, E., "High Potential for Finescreen Technology at WWTWs", H2O, 6:32-34, 2012), which is incorporated by reference. If the auger and dewatering box are used to further dewater sludge, water separated in the dewatering box may be recirculated to upstream of the belt or to the downstream process tank. The liquid stream resulting from sludge dewatering is likely to be very small relative to the influent flow and is not likely to materially alter the design or operation of the plant.

For the MBR flowsheet, it was assumed that the WAS was digested aerobically, which further increased the plant total oxygen demand. For the PC+MBR and RBS+MBR flowsheets the mixed sludge was digested anaerobically at the same HRT of 25d; the higher TSS of the RBS+MBR sludge translated into a 29% smaller digester. Both plants produced the same amount of biogas (1,500 m³/d), which was converted into electricity through a combined heat and power (CHP) system. It was assumed that a reciprocating engine could convert 35% of the energy contents of the biogas into electricity (US EPA, 2008); the production of any useable heat was not taken into account in the energy balance.

The electricity balance for the three flowsheets is presented in Table 5 in kWh/d. Primary treatment added 200 and 530 kWh/d to the PC+MBR and RBS+MBR flowsheets, respectively. The additional energy for the RBS as compared to PC is compensated by savings in sludge processes (elimination of thickening and enabling use of smaller anaerobic reactors).

Savings in liquid line biological treatment from using primary clarification (i.e. the PC+MBR and RBS+MBR flowsheets) as compared to the MBR flowsheet were 25% for the blowers & mixers only, and 21.5% for the all energy sources related to biological treatment (blowers & mixers, nitrate recycle and RAS/WAS pumping).

TABLE 5

Electricity balance (kWh/d)

| Parameter | MBR | PC + MBR | RBS + MBR |
|---|---|---|---|
| Consumption | | | |
| Coarse screening & grit removal | −330 | −330 | −330 |
| Primary treatment | | −200 | −530 |
| Fine screening | −100 | −100 | |
| Chemical dosing | −120 | −120 | −120 |

TABLE 5-continued

Electricity balance (kWh/d)

| Parameter | MBR | PC + MBR | RBS + MBR |
|---|---|---|---|
| Biological blowers & mixers | −3,260 | −2,450 | −2,450 |
| Nitrate recycle | −400 | −400 | −400 |
| RAS/WAS pumping | −1,500 | −1,200 | −1,200 |
| Membrane filtration | −1,750 | −1,750 | −1,750 |
| Sludge processes | −2,200 | −1,000 | −620 |
| Electrical consumption | −9,660 | −7,550 | −7,400 |
| Specific electrical consumption (kWh/m$^3$) | −0.51 | −0.40 | −0.39 |
| Production | | | |
| Electricity from Biogas (CHP) | | 3,460 | 3,460 |
| Specific electrical production (kWh/m$^3$) | | 0.18 | 0.18 |
| Net electrical balance | −9,660 | −4,090 | −3,940 |
| Net specific electrical consumption (kWh/m$^3$) | −0.51 | −0.22 | −0.21 |

The energy for sludge treatment is significantly different for the three flowsheets. The MBR flowsheet electricity is highest (2,200 kWh/d) due to use of aerobic digestion. The electricity requirement for the PC+MBR option (1,000 kWh/d) includes thickening, digester mixing and pumping, and dewatering. The lower consumption for the RBS+MBR (620 kWh/d) reflects savings related to co-thickening with the RBS.

Overall, the flowsheets including primary treatment allowed a reduction in electricity consumption of 20% as compared to the MBR only flowsheet. If electricity production is taken into account, the reduction would be 60%.

Plant footprints were estimated with the methodology used by Young et al (2013) (mentioned above), assuming that the distance between structures is 6 m and setting the buffer zone around the plant to zero. The land area required for the unit processes of the MBR plant was estimated to be 7,500 m$^2$. For the PC-MBR plant, primary clarifiers were added, the biological reactors were smaller, and the aerobic digesters were replaced with anaerobic digesters, for a net increase to 8,500 m$^2$. For the RBS-MBR flowsheet, RBS were added (footprint approximately $^1/_{10}{}^{th}$ the size compared to primary clarifiers), biological reactors were smaller, there were no separate thickening unit processes and the anaerobic digesters were smaller (as compared to the PC-MBR flowsheet), resulting in a total plant footprint of 6,500 m$^2$. Therefore, if the MBR plant is taken as a reference, the PC-MBR area would increase by approximately 13%, but the RBS-MBR area would decrease by approximately 13%. For reference, a plant based on conventional activated sludge with primary clarification and anaerobic digestion would have a land area of 14,000 m$^2$.

In the example above, the RBS provides performance equal or better than primary clarifiers but only occupy $^1/_{10}{}^{th}$ of the footprint and are therefore helps with MBR to build compact plants.

An RBS-MBR process provides diversion of organics from biological treatment resulting in smaller biological reactors (−38%) and lower oxygen requirements (−25%) when compared to a conventional MBR according to the example above. Furthermore, RBS technology offers options for sludge handling: primary solids can be dewatered within the unit to 10 or 20-30% TSS, or waste activated sludge can be co-thickened with the primary sludge, for example to >10% TSS.

An RBS unit was evaluated over one year with municipal wastewater. Three different belt opening sizes (750, 350 and 154 µm) had a median removal of TSS of 49%, 66% and 72%, respectively; COD removal was 16%, 30% and 39%, respectively. The hydraulic loading rate used for design was validated using the smallest belt opening size.

In general, the capital cost of plants including primary treatment and anaerobic digestion (i.e., PC-MBR or RBS-MBR) is higher than the reference flowsheet (MBR). However, for situations where sludge management and/or energy cost reduction is a significant driver, the use of RBS with MBR may provide benefits over primary clarifiers: i) smaller plant footprint, ii) elimination of fine screening, iii) volume reduction of residual solids, and iv) better protection of the filtration membranes.

The RBS based primary treatment as described above may be used with any other flow sheet described later in this specification, particularly flowsheets also having an MABR, or with an IFAS reactor. Alternatively, other forms of micro-sieve might be used in place of the RB S.

Membrane Aerated Biofilm Reactor (MABR)

Energy consumption for the treatment of municipal sewage is a topic of growing concern due to the significant operating costs and environmental impact of greenhouse gas emissions associated with the energy demand for wastewater treatment. The largest energy consumer in conventional treatment processes is aeration, which accounts for 50 to 65% of the energy requirement. Conventional aeration technologies, such as fine bubble diffusers, are inefficient from an energy perspective, with typical aeration efficiencies of 1 to 2 kg $O_2$/kWh.

The Membrane-Aerated Biofilm Reactor (MABR) process is an innovative alternative to conventional aeration technologies that has the potential to reduce the energy demand for aeration by up to 4-fold. In a later section of this specification, a hybrid MABR process is used in a low energy, or possibly energy-neutral, wastewater treatment flowsheet. This section will describe the MABR and present some experimental results.

Figure 5:
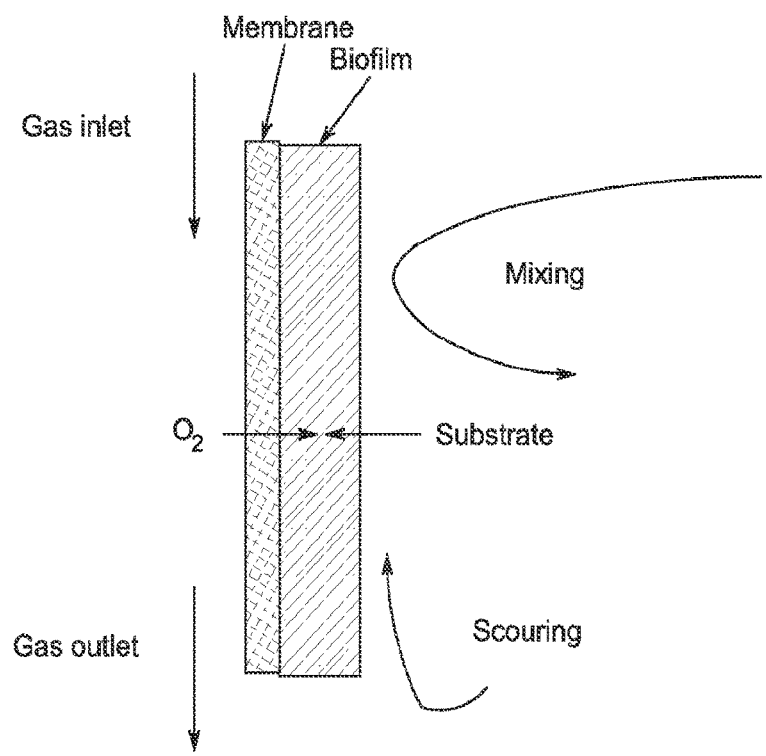
FIG. 5 is a conceptual representation of an MABR process.

The MABR process employs a gas transfer membrane to deliver oxygen to a biofilm that is attached to the surface of the membrane. Rather than trying to prevent the formation of a biofilm, the MABR process utilizes it and leverages the synergy between a gas transfer membrane and an attached growth biofilm (FIG. 5).

An MABR process offers the benefits of conventional biofilm processes, possibly with one or more of the following additional advantages: a) the potential to transfer oxygen very efficiently and at low energy input; b) easy control of the oxygen supply rate by changing the gas feed rate or pressure; c) decoupling of oxygen transfer from bubbling and feeding oxygen from the side opposite to the substrate opens new reactor design opportunities; and e) the absence of bubbles reduces foaming and the stripping of volatile compounds.

GE Water & Process Technologies has developed the gas transfer membrane described herein specifically for MABR applications. It was designed to provide improvements or alternatives directed at one or more MABR deployment challenges, specifically: a) development of high membrane packing density modules that are tolerant to suspended solids; b) packaging of the membrane into an easy-to-deploy engineered product; c) efficient mixing at the membrane surface with low energy input; and d) control of the biofilm to maintain optimal thickness.

Figure 6:
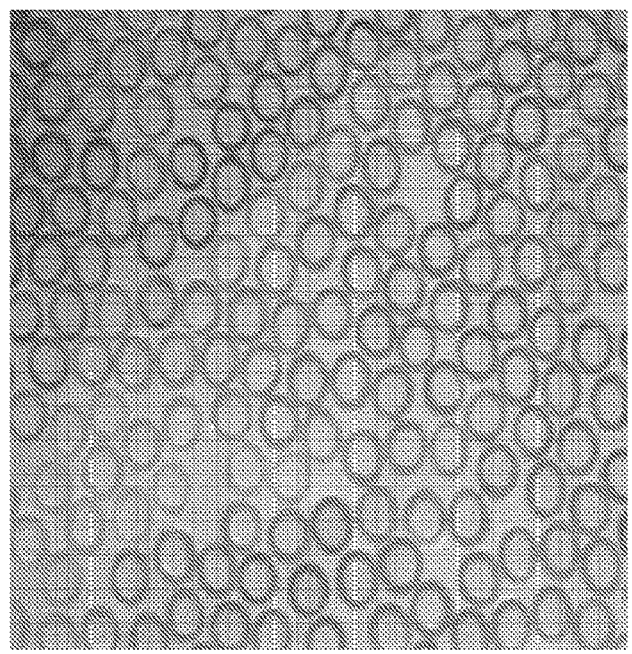
FIG. 6 contains drawings and photographs of a gas transfer membrane cord and some individual parts of it.
Figure 6:
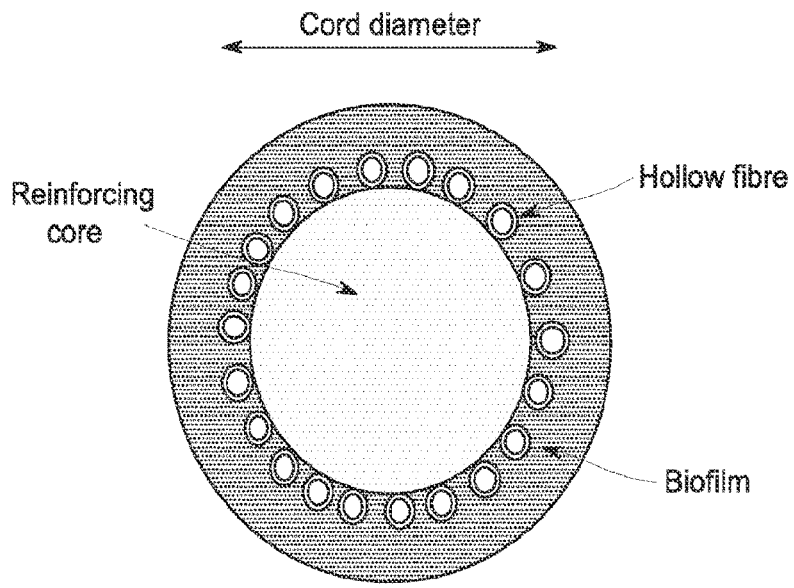
Figure 6:
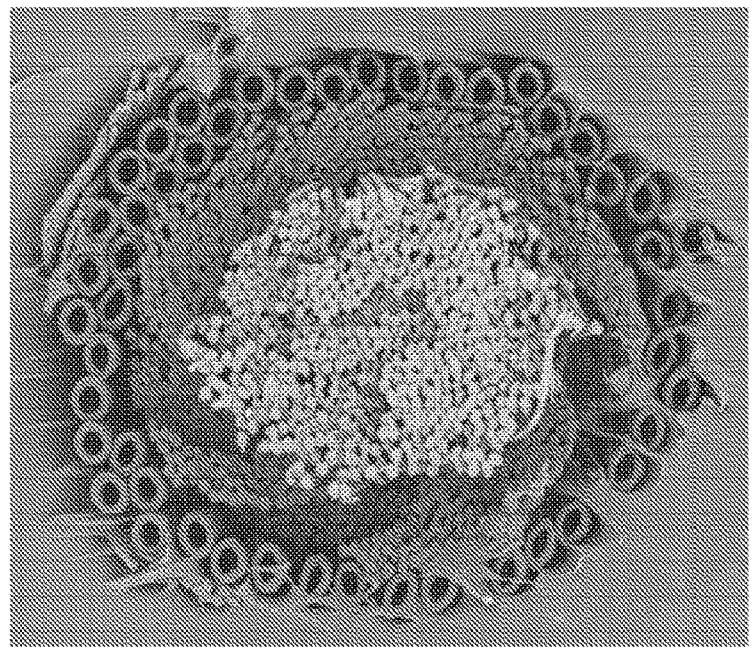
Figure 6:
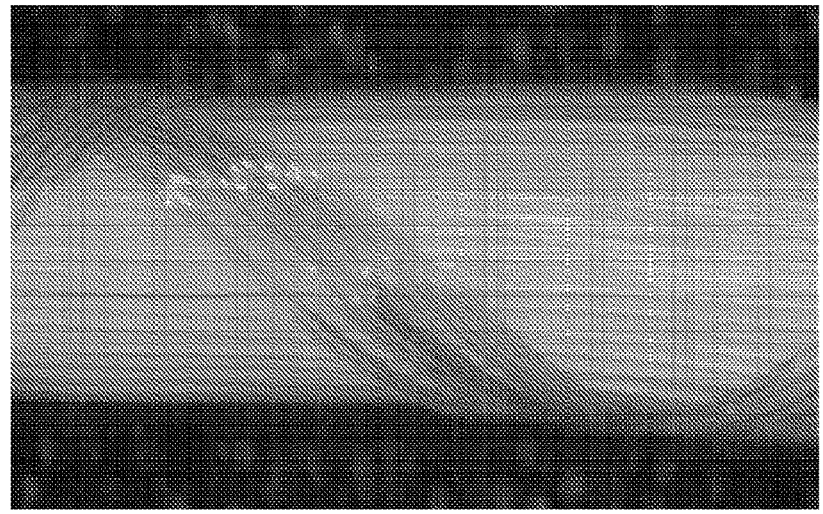

The building block for the gas transfer membrane is a hollow fiber membrane shown in FIG. 6a. The hollow fibers, made of a dense wall, oxygen-permeable polymer such as poly methyl pentene (PMP) have an outside diameter less than 100 µm and a wall thickness of 15-20 µm. The hollow fibers are deployed in a "cord" (FIG. 6b), which is composed of a yarn that provides a reinforcing core and multiple hollow fibers distributed around the circumference of the core. Optionally, the yarn in the center of the core may be made up of multiple yarns twisted or braided together. The cord is durable yet flexible so that it can be subjected to agitation for mixing and biofilm control. The word "yarn" in this description includes tows and untwisted yarns, which in an embodiment, is made of continuous filaments.

An actual membrane cord is shown in FIGS. 6c and 6d. The embedding material visible in FIG. 6c is hot melt adhesive used to facilitate cutting the cord. The blue (outer) wrapping yarn visible in FIG. 6d holds the cord components together and protects the hollow fibers from abrasion.

A bare cord has a diameter of approximately 1 mm, which will grow to 1.4 to 1.5 mm when covered with a biofilm. The biofilm impregnates the core, fills in the gaps around the hollow fibers and, to some extent, forms a film around the cord (as illustrated in FIG. 6b). The cord does not have a flat and smooth surface but could rather be described as a series of hills and valleys, providing a desirable environment for the biofilm to anchor to and prevent complete biofilm detachment during scouring events.

One characteristic of the cord structure is that it allows controlling the membrane surface area to biofilm surface area ratio by changing the number of hollow fibers in the cord construction. A typical cord would have a ratio of membrane surface area over biofilm surface area of 2 to 5, which helps to ensure that sufficient oxygen can be delivered to the biofilm and is not rate-limiting.

Figure 7:
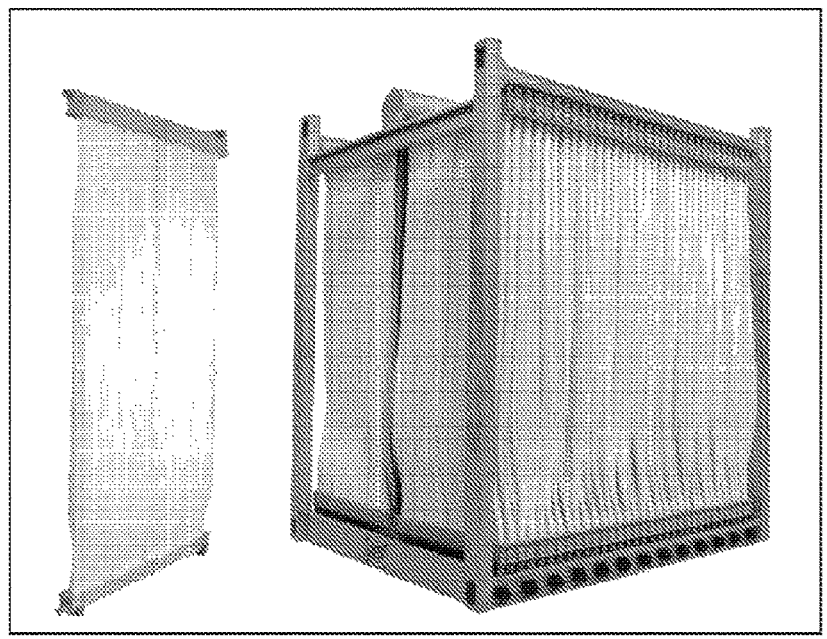
FIG. 7 contains photographs of a ZeeWeed 500D module and cassette.

The conceptual design of the new MABR module mimics the form factor of the ZeeWeed 500D filtration membrane product (FIG. 7). Multiple cords are potted into top and bottom headers, which are used to deliver and distribute air to the inside of the fiber lumens and collect the exhaust gas. Each module has a header-to-header distance of approximately 1.9 m and contains thousands of cords geometrically spaced apart in the headers. The cords are mounted with excess length, or slack, to allow them to sway in use. Membrane modules are mounted in cassettes similar to filtration membrane cassettes and immersed in MABR tanks. An air scouring system at the bottom of the cassette is used to replenish wastewater within the modules and control biofilm thickness. A construction similar to the ZeeWeed 500D immersed hollow fiber product results in a cassette size is the largest building block that can be shipped in a standard container.

Mixing and scouring are important functions in an MABR. While oxygen is delivered through the membrane, the substrate (e.g., COD or ammonia) comes from the bulk solution as in a conventional biofilm process. Mixing is required to provide renewal of substrate to the biofilm surface. The purpose of scouring is to control the biofilm to a desired thickness and to remove excess biomass from the membrane bundle and the cassette.

Although the MBR and MABR products look similar (FIG. 7), their mixing requirements are for different purposes. In an MBR, large amounts of suspended solids are carried into the hollow fibers bundles and left behind by permeate removal; the role of the aeration scouring is to prevent the buildup of solids within the MBR module. In a MABR, the role of the mixing aeration is to renew the concentration of soluble components at the biofilm surface, not to remove suspended solids, and therefore a much lower level of aeration is required. A more intense level of aeration can be used intermittently (e.g., daily or weekly) to control the biofilm thickness.

Membrane modules are mounted in the cassette with sufficient slack in the cords to allow free swaying in response to mixing aeration. Similar to an MBR, a coarse bubble aeration grid is attached to the bottom of the cassette and cassettes are immersed just below the surface to minimize the discharge head for mixing aeration.

There is a single source of air per cassette for process air and mixing. The air feed pressure is selected so that the exhaust air comes out at a pressure greater than the static head above the mixing aeration grid (i.e., approximately 20 to 25 kPa relative), possibly providing one or more of these benefits: a) the hollow fiber lumen air pressure is maintained at a pressure greater than the static head at all points along the membrane length, which ensures that the membrane will not be flooded should there be a leak or a broken hollow fiber; b) the driving force for oxygen permeation is increased; c) the exhaust air can be collected and injected into the cassette aeration grid for mixing; and d) the mixing air is depleted in oxygen, which may be desirable to avoid transferring dissolved oxygen into the bulk liquid.

The exhaust air flow rate to the aeration grid is continuous but is converted to localized bursts of large bubbles to increase the mixing efficiency using an inverted siphon type pulsing aerator, such as the LEAP™ aerator available from GE Water & Process Technologies. In this case, the aerator may produce a burst of 0.5 to 3 seconds at least once every 20 seconds. Optionally, the air flow to may be converted to bursts by using one or more valves to collect the air from multiple headers and distribute it to the aerators in sequence, in a manner analogous to cyclic aeration of immersed filtering membranes. In this case, the aerator may produce a burst of 0.5 to 20 seconds at least once every 200 seconds.

Figure 19:
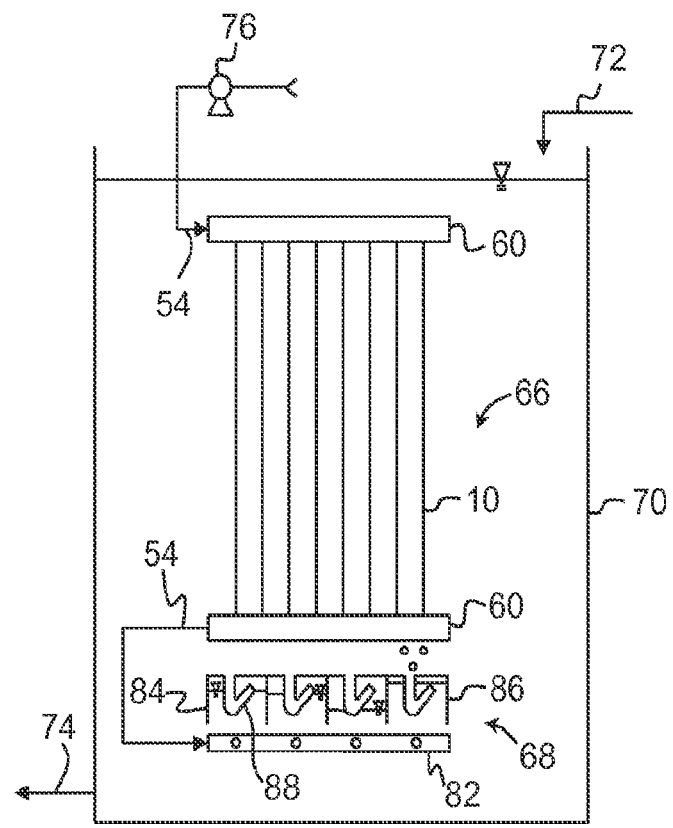
FIG. 19 is a schematic drawing of a membrane aerated biofilm module.

FIG. 19 shows a module 66 immersed in a tank 70 to create an MABR. The tank 70 is filled with water to be treated from an inlet 72. Treated water is removed through an outlet 74. Air, or another gas, is blown into the module 66 by blower 76. The gas is blown into one header 60, travels through the cords 10, and exits from the other header 60. Exiting air flows to a supply pipe 82 where it is distributed to the compartments of a transducer 84. The transducer 84 collects gas ejected from the supply pipe 82 below a shell 86. The pocket of gas grows larger as gas is accumulated as shown in the first two compartments of the shell 86, counting from the left side of the shell 86. When the pocket of gas extends to the bottom of the J shaped tube 88, as in the third compartment of the shell 86, the gas is released through the J shaped tube as shown in the last compartment of the shell 86. In this way, large bursts of bubbles are released periodically without requiring a large volume of gas to be continuously pumped into the tank 70. Periodic large bursts of bubbles can be more effective for renewing the water around the cords 10 or removing biofilm from the cords 10 than the same amount of gas supplied as a continuous stream of bubbles from supply pipe 82.

Target performance parameters for the gas transfer membrane and the MABR process help support low energy or energy-neutral flowsheets for wastewater treatment as described herein. Key performance parameters for an MABR are similar to those for bubble aeration: OTR, oxygen transfer rate (kg $O_2$/d); OTE, oxygen transfer efficiency (%); and AE, aeration efficiency (kg $O_2$/kWh). Oxygen transfer is expressed as a flux (J in g $O_2$/d/km cord), on the basis of the length of cord (L in km cord). For a given treatment system, OTR is related to J as follows:

$$OTR = J \cdot L \qquad \text{Equation 1}$$

Target values for these parameters in an exemplary cord are presented in Table 6. For this cord, assuming a biofilm-covered outside diameter of 1.5 mm, the conversion factor from length of cord to biofilm surface area is =4.7 m2 biofilm/km cord.

The oxygen flux of the membrane, J, can be calculated based on a mass transfer coefficient and a driving force:

$$J = K_{cord}(\Delta p)_{ln} \qquad \text{Equation 2}$$

The mass transfer coefficient $K_{cord}$ (g $O_2$/d/km/bar) is a property of the cord that must be derived experimentally. The driving force is expressed as a logarithmic average to account for the fact that it changes along the length of the cord from inlet to outlet as oxygen is diffusing out and pressure losses decrease the absolute pressure. $(\Delta p)_{ln}$ (bar) is determined by the following expression:

$$(\Delta p)_{ln} = \frac{p_{in} - p_{out}}{\ln\left[\frac{p_{in} - HC_L}{p_{out} - HC_L}\right]} \qquad \text{Equation 3}$$

where:
p=oxygen partial pressure (bar)
H=Henry's Law constant (bar/(mg/L))
$C_L$=oxygen concentration at the surface of the membrane (mg/L)

TABLE 6

Target performance parameters for the new gas transfer membrane and MABR process

| Performance Parameter | Units | Value |
|---|---|---|
| Oxygen flux (J) | g $O_2$/d/km cord | >60 |
| Oxygen transfer efficiency (OTE) | % | >60 |
| Aeration efficiency (AE) | kg $O_2$/kWh | >6.0 |

The target oxygen transfer capacity expressed as a flux is >60 g $O_2$/d/km cord.

It is useful to relate the target oxygen flux in this work to that achievable in conventional biofilm reactors, where the aerobic treatment rate achievable is typically limited by oxygen transfer. A review of the biofilm tertiary nitrification literature (where the carbon/nitrogen ratio is low and thus favorable to the development of a nitrifying biofilm) shows that nitrification rates vary between 0.5-2.0 $NH_4$—N/d/m² biofilm. In the design of a MABR, it is useful to remove the oxygen limitation since membranes are more expensive than the supports used in conventional biofilm processes such as moving bed biofilm reactors (MBBR). Bonomo et al (2000) did experiments with pure oxygen in a nitrifying MBBR and found that high nitrification rates (2.0-3.0 g $NH_4$—N/d/m² biofilm) were limited by ammonia mass transfer under ammonia loading conditions typical of municipal wastewater.

Based on an oxygen requirement of 4.6 g $O_2$/g $NH_4$—N nitrified, the equivalent nitrification rate of the new MABR membrane would be 2.8 g $NH_4$—N/d/m² biofilm (using 4.7 m² biofilm/km cord). Similarly, based on an oxygen requirement of 0.6 mg $O_2$/mg COD oxidized, this oxygen transfer capacity would be equivalent to a COD removal rate of 21 g COD/d/m² biofilm. The point here is not to suggest that these removal rates for ammonia or COD are always achievable in an MABR, but it is to ensure that oxygen transfer is not rate limiting.

With a gas transfer membrane, if the gas flow rate change due to oxygen transfer is neglected, oxygen transfer efficiency (OTE) is simply defined as:

$$OTE = ((p_{in} - p_{out})/p_{in}) \cdot 100 \qquad \text{Equation 4}$$

where $p_{in}$ and $p_{out}$ are the oxygen partial pressures at the inlet and outlet of the module (FIG. 1).

OTE can be used as a process control parameter; the air feed flow rate and/or pressure can be controlled to achieve a target OTE value. At low OTE, the driving force and oxygen flux are maximized, and the required membrane surface area is minimized; but a lot of air has to be pumped through the gas transfer module at potentially significant energy cost. At high OTE the reverse occurs: more membrane surface is needed to transfer the required amount of oxygen, but the energy cost is reduced. A life cycle cost optimization (i.e. minimizing the sum of membrane capital costs+the net present value of the energy costs) could be done for a specific case and would show that the optimal OTE is typically found in the intermediate range of 40% to 80%. The target OTE for the new MABR product is 60%.

When designing a fine bubble aeration system, the power input for the blower is calculated by two different ways—first to meet the oxygen demand and second to keep the mixed liquor in suspension—and the higher of the two values determines the blower size. A similar situation exists for an MABR: there is a power input component required for aeration to meet the oxygen demand and a second component to provide mixing on the liquid side to promote substrate penetration into the biofilm (i.e., renew the boundary layer). Mathematically, aeration efficiency can be expressed as follows:

$$\frac{1}{AE} = \frac{W}{32 \times (O_2)OTE} + \frac{24 P_M}{J} \qquad \text{Equation 5}$$

where:
AE=aeration efficiency (kg $O_2$/kWh)
J=oxygen flux (g $O_2$/d/km cord)
OTE=oxygen transfer efficiency (−)
$P_M$=specific mixing power input (W/km cord)
$x(O_2)$=mole fraction of oxygen in the feed gas (0.21 for air)
W=adiabatic compression energy for the process aeration blower (Wh/mol air)

In Equation 5, the two terms have units of kWh/kg $O_2$ and represent the specific energy to cause the reactants to meet in the biofilm: the first term for oxygen and the second term for the substrate.

To illustrate with an example, the energy W required to compress ambient air to 1.6 bar (with an overall blower, motor and drive efficiency of 0.6) is 0.57 Wh/mol (Côté et al, 1988). Since the mixing function is accomplished with the cord exhaust gas (discharged at a pressure of 1.25 bar), the second term of Equation 3 is set to zero, and 1/AE is calculated as 0.141 kWh/kg $O_2$ (for an OTE=60%). AE=1.0/0.141=7.1 kg $O_2$/kWh, in line with the target listed in Table 6. The specific energy is split about 60% for oxygen permeation and 40% for mixing.

Experimental validation was conducted with pilot modules in clean water batch re-aeration tests and continuously operating pilot plants, one with a synthetic feed representing a (tertiary) nitrification application and one with a primary effluent as the feed representing a hybrid reactor in which the module is immersed in a suspended biomass. Pilot modules were built with small square headers and 1.8 m of exposed cord length. Each module contained 600 cords, for an approximate total cord length of 1.0 km. Experiments were run with two types of cords: the first containing 48 hollow fibers, and the second containing 96 hollow fibers.

Clean water re-aeration tests were conducted by immersing a pilot module into a 26 L tank (cross-section 17×7 cm). Dissolved oxygen was consumed by adding sodium sulfite ($Na_2SO_3$) in excess. The tank was mixed by rapid pumping in a closed loop and by nitrogen sparging. After the tank contents were fully mixed, air was pumped down the lumens of the cords at a flow rate of 15-25 L/h, which created a pressure loss of 0.2 to 0.4 bar. For all tests, the driving force was about 0.2 bar of oxygen partial pressure, which corresponds to zero DO ($C_L=0$). Each experiment lasted 20-50 minutes. During the experiment, the feed and exhaust flow rates, the oxygen in the exhaust gas and the dissolved oxygen (DO) in the tank were measured to determine the oxygen flux through a mass balance.

Figure 15:
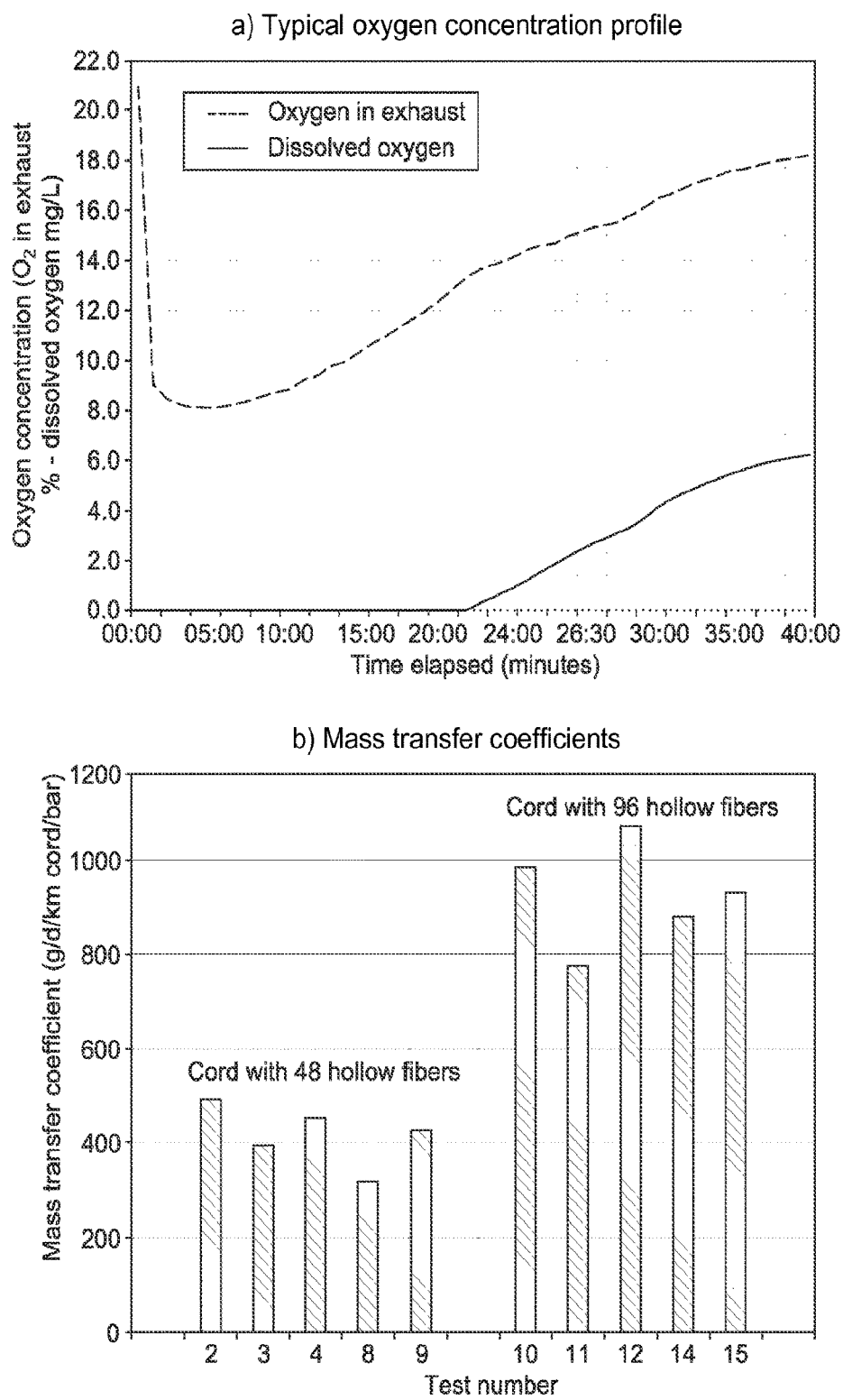
FIG. 15 contains graphs showing the results of clean water re-aeration test results.

FIG. 15a shows the evolution of oxygen concentration in the exhaust air and DO in the tank as a function of time for a typical clean water re-aeration test. First looking at the blue (solid) curve, the initial oxygen concentration in the exhaust was 20.9%, the concentration of oxygen in air. Oxygen in the exhaust rapidly decreased to reach a value of about 8%, 5 minutes after the start of the test; this point represents the maximum oxygen flux before any liquid film resistance developed. From 5 to about 20 minutes, the $O_2$ in exhaust gradually increased without a visible increase of dissolved oxygen in the tank; this corresponded to neutralization of hydrogen sulfite and buildup of dissolved oxygen within the cord structure and in the liquid film around the cord. Dissolved oxygen (red dashed line) was first detected in the tank at 23 minutes. By convention, the mass transfer coefficient $K_{cord}$ was calculated from Equation 2 through a mass balance at the time when the oxygen concentration in the exhaust bottomed out (i.e.; after 5 min in the example of FIG. 15); this ensures that dissolved oxygen in the tank (i.e.; $C_L$) was zero.

Calculated mass transfer coefficients ($K_{cord}$) for 10 re-aeration tests are presented in FIG. 15b. The calculated $K_{cord}$ values were approximately 400 g $O_2$/d/km/bar for the cord containing 48 hollow fibers and 800 g $O_2$/d/km/bar for the cord containing 96 hollow fibers. This illustrates the design flexibility in adjusting the product oxygen transfer capabilities. With the cord containing 48 hollow fibers, the maximum oxygen flux with a $(\Delta p)_{ln}$ equal to 0.2 bar would be 80 g $O_2$/d/km. In practice fluxes will be lower because there is always oxygen build-up at the surface of the membrane (i.e.; $C_L>0$) and the oxygen partial pressure in the exhaust gas is lower than in the feed air (i.e.; $p_{out}<p_{in}$).

Figure 8:
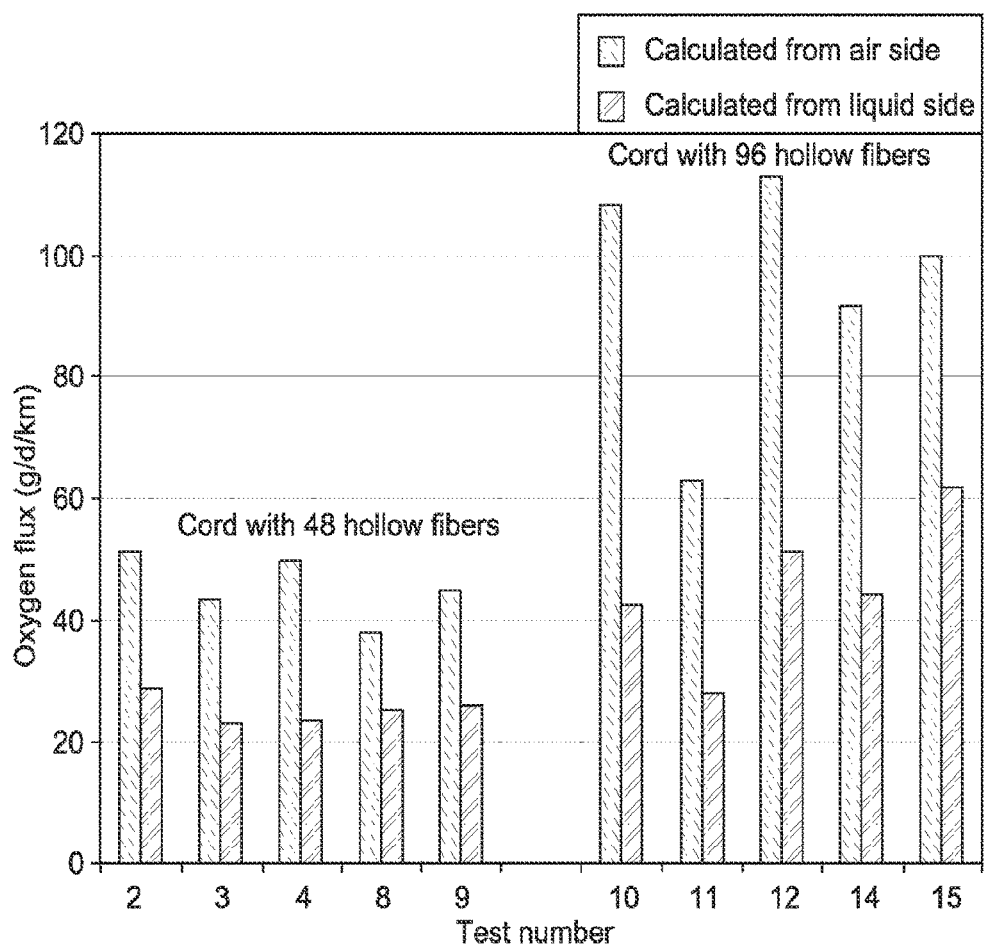
FIG. 8 is a graph of oxygen flux in a clean water re-aeration test for an MABR.

The oxygen fluxes were calculated for 10 different re-aeration tests, both by doing a mass balance on the air side and on the water side, as reported in FIG. 8. By convention, the flux was calculated at the time when DO was equal to 0.5 mg/L in the tank. Systematically, the flux calculated from the air side was higher by a factor of about two as compared to the water side calculation. The air side mass balance was considered more accurate by Gilmore et al (2009) as there is a lag time for distribution of DO in the tank. Fluxes based on the air side were about 45 g $O_2$/d/km for the cord with 48 hollow fibers, and 90 g $O_2$/d/km for the second cord with 96 hollow fibers. These results demonstrate that the cord design can be changed to meet a target oxygen transfer capacity.

A continuous pilot was set up to represent tertiary nitrification of a municipal wastewater treatment plant effluent, consisting of three tanks in series, each equipped with a pilot module of 1.0 km of cord, as described above for the clean water re-aeration test (with 48 hollow fibers). Each tank had a volume of 23 L and was mixed with coarse bubble aeration at a flow rate of 0.27 $m^3$/h operating intermittently, 4 sec/min; this level of aeration was equivalent to a power input of 0.15 W/km for mixing and contributed insignificant transfer of dissolved oxygen. The pilot was operated as a flow-through system (without recirculation) at flow rates of 25-50 L/h, which corresponded to a total hydraulic retention time (HRT) of 80-160 min.

Process air was fed from a common air source to the 3 modules at a flow rate of 60 standard L/hour (20 L/h per module) and a pressure of 1.55 bar absolute. A control valve was adjusted on the exhaust air side to maintain 1.25 bar absolute. The flow rate and oxygen concentration of the exhaust air were measured to close the mass balance.

The feed was a synthetic solution consisting of tap water (75%) and permeate of an MBR pilot treating municipal wastewater (25%) for micro-nutrients, doped with ammonium carbonate to a blended ammonia concentration ranging from 20-60 mg $NH_4$—N/L. The carbon to nitrogen ratio (soluble COD/$NH_4$—N) of the blend was lower than 0.5 for all conditions tested.

Figure 9:
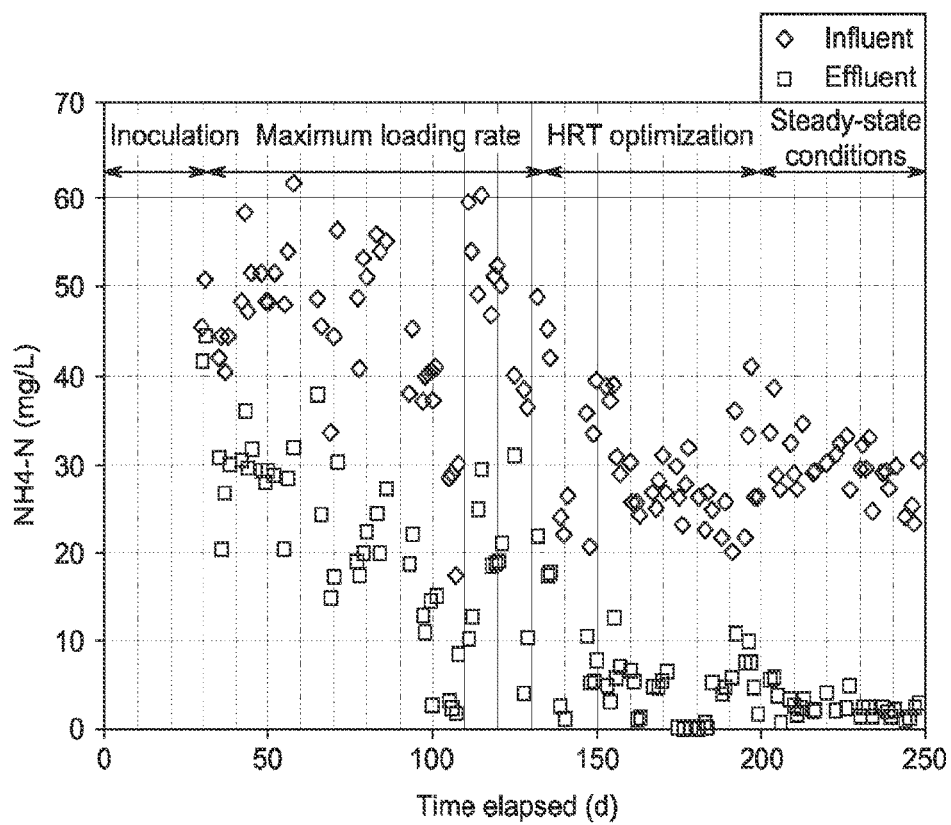
FIG. 9 is a graph of pilot operating regimes.

The pilot was run for 250 days under various conditions as shown in FIG. 9. During the "Inoculation" period (day 1-30), nitrifying mixed liquor from a nearby MBR was recirculated through the pilot to promote attachment of a nitrifying biomass. This was followed by a "Maximum loading rate" period (day 31-136) where ammonia in the influent was in the range of 40-60 mg/L to promote biofilm growth and determine the maximum nitrification rates. During this period, the HRT was maintained at 80 min. In the following period, "HRT optimization" (day 137-198) the ammonia in the influent was reduced to a target value of 30 mg/L (typical of sewage) and the HRT was changed between 80-160 min to determine the optimal value required for total nitrification. From day 199, the pilot was operated under "Steady state conditions" at an HRT of 100 min.

Figure 10:
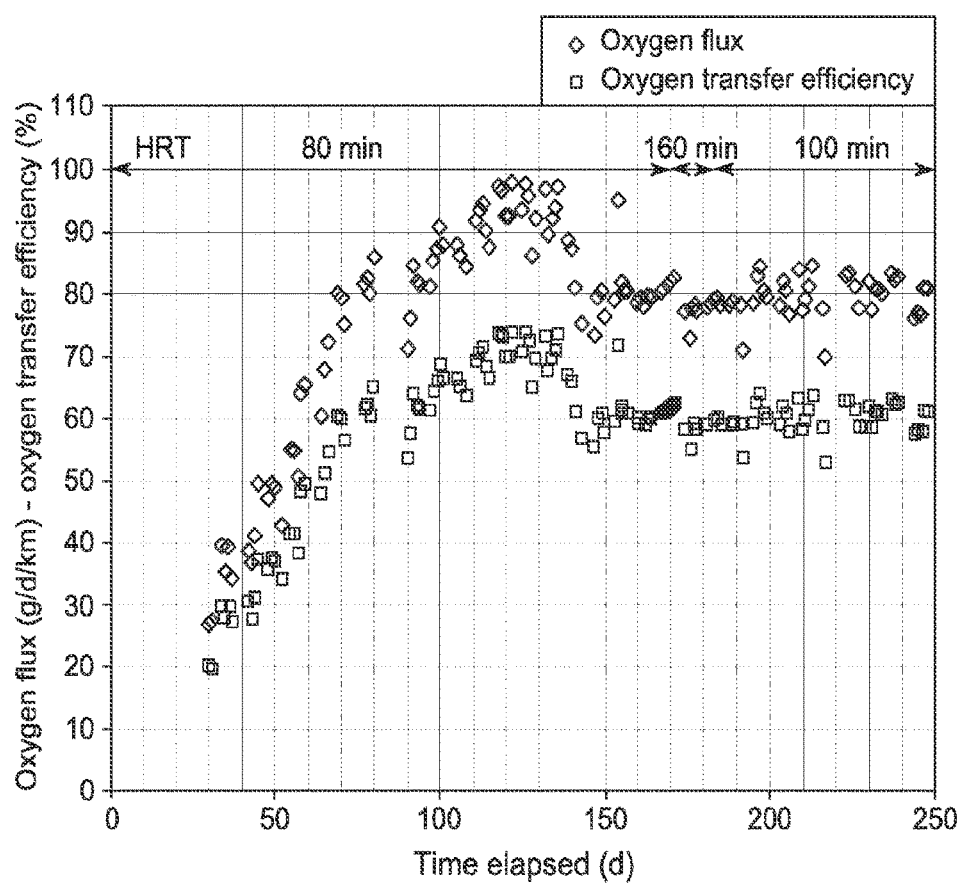
FIG. 10 contains graphs showing oxygen transfer and dissolved oxygen.
Figure 10:
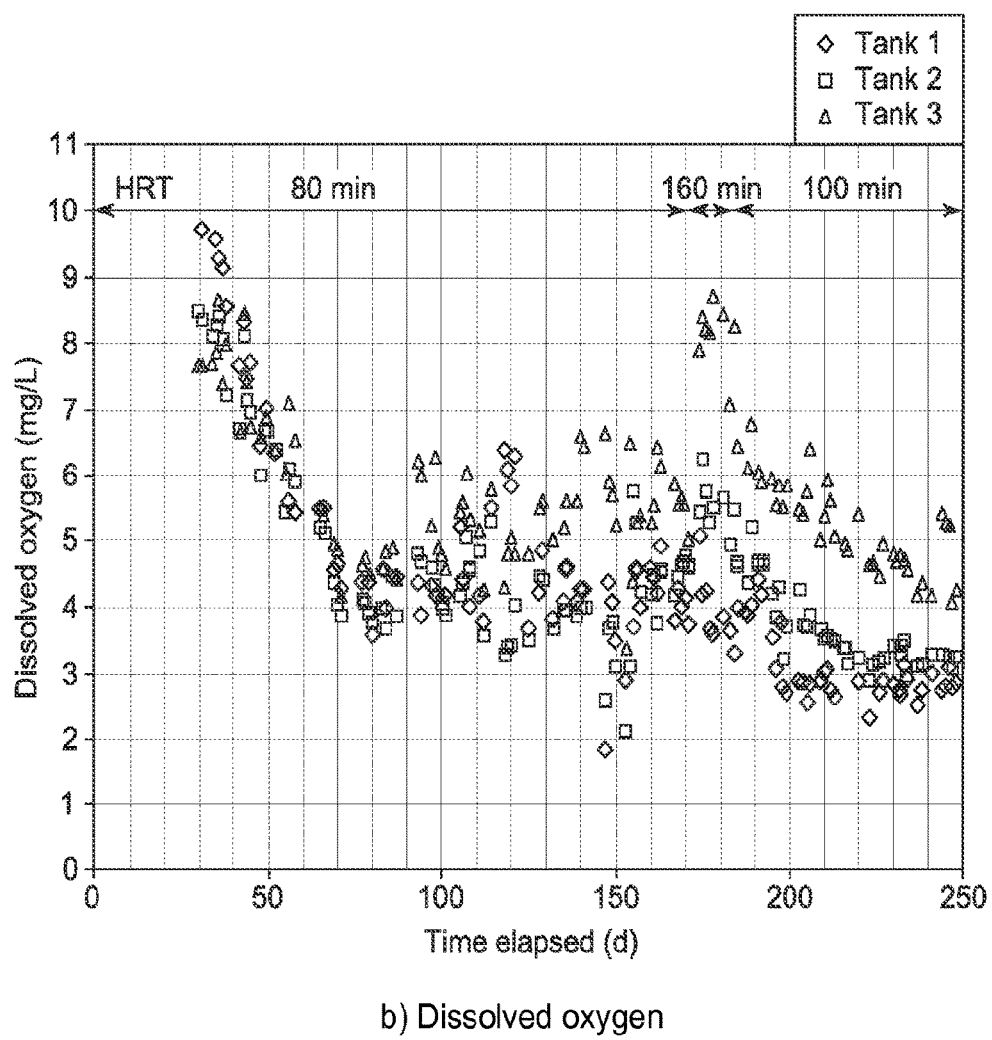
Figure 11:
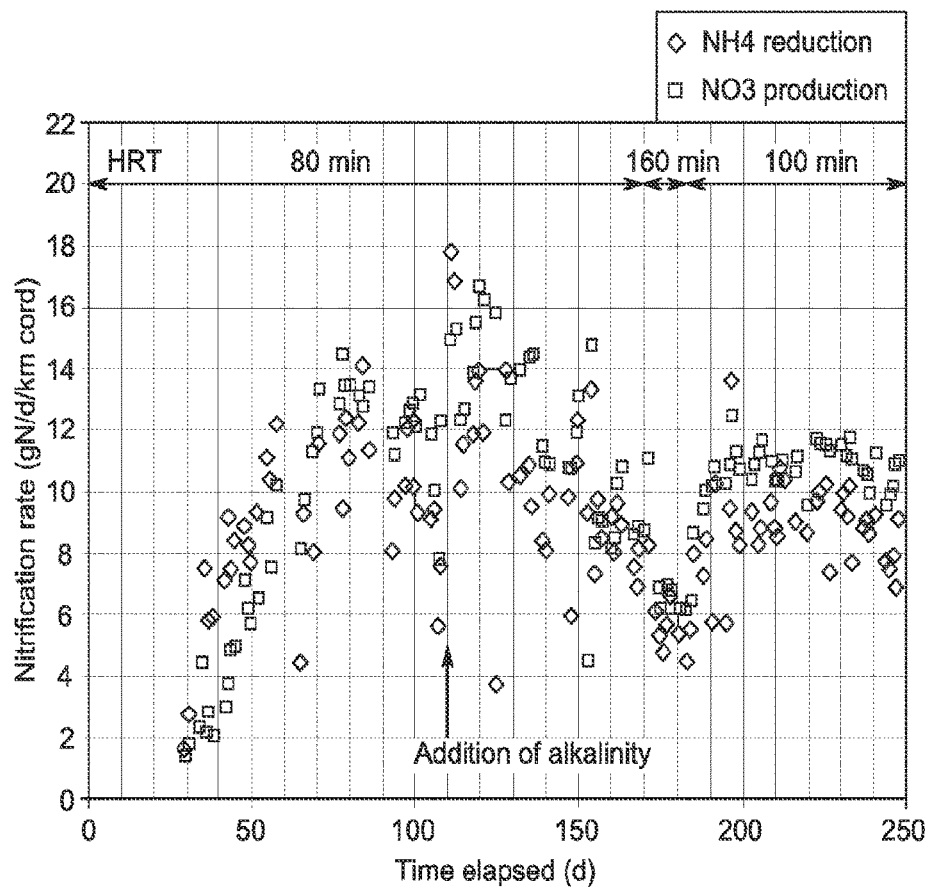
FIG. 11 contains graphs showing nitrification rates.
Figure 11:
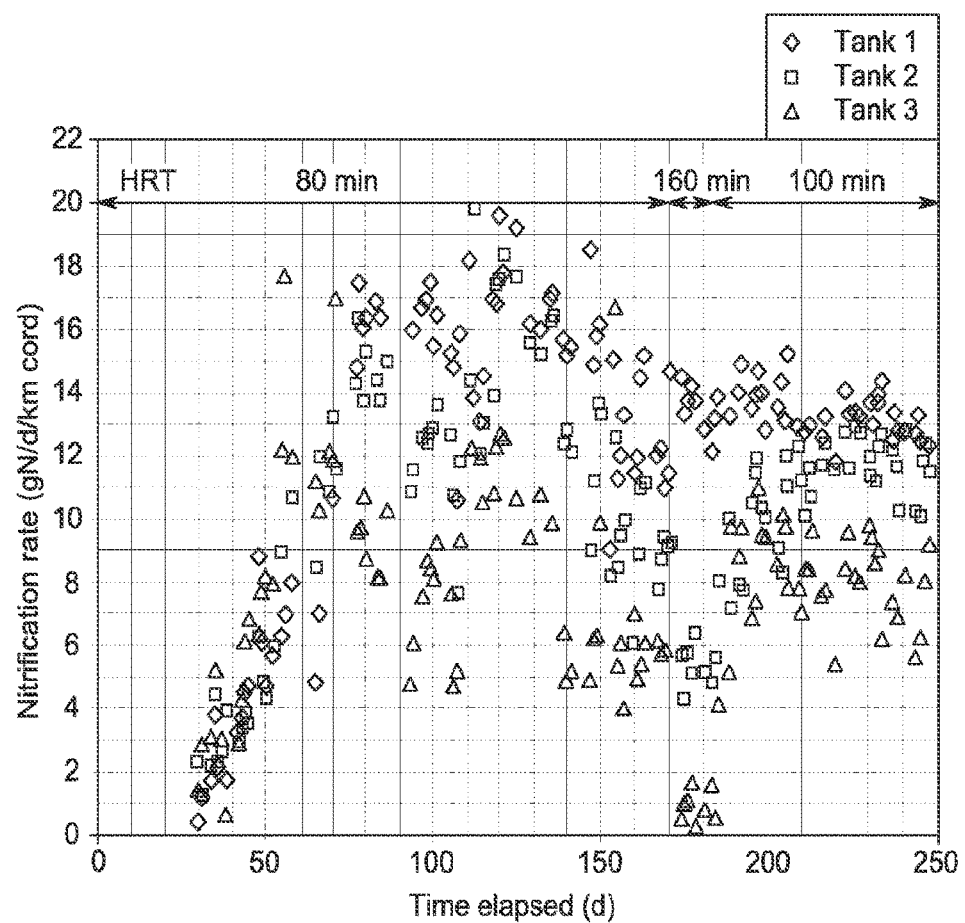

The oxygen transfer and dissolved oxygen in the tanks are plotted in FIG. 10 while nitrification rates are presented in FIG. 11.

The oxygen flux and transfer efficiency gradually increased through the Maximum loading rate period to 90-100 g $O_2$/d/km cord and 75%, respectively (FIG. 10a). These values are about twice what was obtained in the clean water experiments with the 48 hollow fibers cords under similar driving forces. In clean water oxygen builds up in the boundary layer at the surface of the membrane, reducing the driving force for permeation. In an MABR, the biofilm consumes the DO near the membrane surface and effectively forces more oxygen to permeate. This illustrates a key feature of aeration with an MABR: performance in wastewater is better than performance in clean water; this is the reverse of what happens with bubble aeration where performance degrades when going from clean water to wastewater (accounted for by the alpha factor).

Early in the experiment, the membranes essentially transferred oxygen to saturation into the bulk liquid. As the biofilm developed, DO decreased in the tank (FIG. 10b) while the nitrification rate increased sharply (FIG. 11).

At the end of the Maximum loading rate period (day 100-136), the nitrification rate leveled off at approximately 13 g $NH_4$—N/d/km cord (FIG. 11a). This nitrification rate was not limited by ammonia, as the effluent concentration was still between 10-30 mg/L, or by oxygen, as DO in the reactor was 4-6 mg/L. It was realized that availability of alkalinity was limiting nitrification; addition of sodium bicarbonate on day 110 resulted in a sudden increase of the nitrification rate to values exceeding 16 g $NH_4$—N/d/km cord. Using the conversion factor given above of 4.7 $m^2$ biofilm/km cord, the nitrification rate reached 3.4 g $NH_4$—$N/d/m^2$. This is a rather high value considering that with a conventional biofilm process, this level of nitrification rate can only be achieved using pure oxygen (Bonomo et al, 2000).

From a mass balance point of view, nitrification accounted for about three quarters of the oxygen transferred (16 g $NH_4$—N/d/km cord×4.6 g $O_2$/g $NH_4$—N=74 g $O_2$/d/km cord) during the Maximum loading rate period. The rest of the oxygen is believed to have escaped as tiny bubbles from locally exceeding saturation, or with the effluent as dissolved oxygen.

During the HRT optimization and Steady-state periods (>day 137), when the feed ammonia was reduced to a target value of 30 mg/L, the oxygen flux and the OTE stabilized at values of 80 g $O_2$/d/km cord and 60%, respectively, exceeding the target values given in Table 1. When the HRT was doubled to 160 min (day 174-184), the ammonia in the effluent was reduced to about 0.2 mg/L (FIG. 9) and DO in Tank 3 increased to saturation (FIG. 10b). It can also be seen from FIG. 7b that the nitrification rates in Tanks 2 and 3 dropped sharply during this period, as the loading rate was lower. During the steady-state period (day >199, HRT of 100 min), the effluent ammonia concentration averaged 2.0 mg/L.

The nitrification rate was calculated from both the reduction of ammonia and the production of nitrate (FIG. 11a). While the numbers are close, the rates calculated from the production of nitrate are higher than those from the reduction of ammonia (especially during the Steady-state period). This is the reverse of what would be expected as some nitrogen could have been removed by other means such as biomass growth, nitrite production, volatilization as nitrogen gas, etc. While the reason for this is not known, it can safely be concluded that full ammonia conversion to nitrate took place. This supports the intended metabolic pathway for nitrogen removal through conventional nitrification-denitrification.

Figure 12:
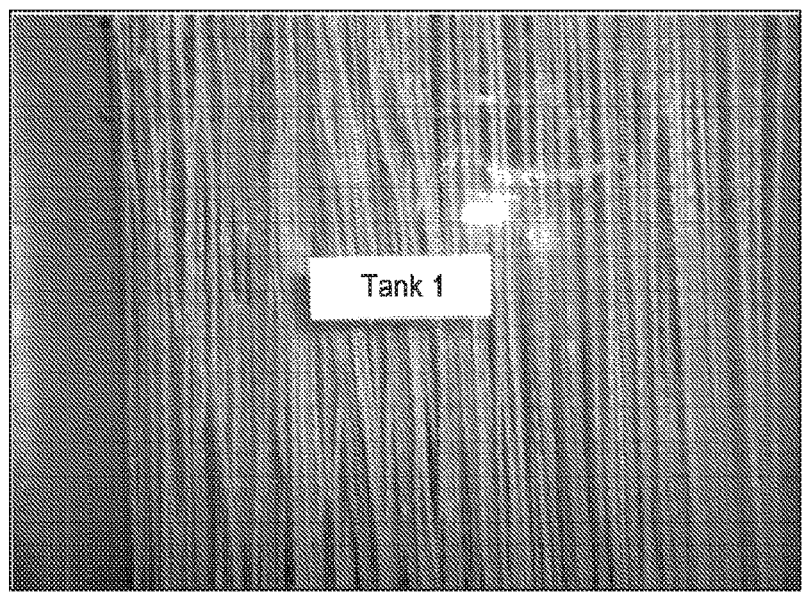
FIG. 12 is a photographs of a cord bundle covered with a nitrifying biofilm in a clear tank.

A picture of the cord bundle from Tank 1 is shown in FIG. 12, taken at the end of the Maximum loading rate period. The cords were a light brown color and appeared to be covered with an uneven biofilm. There was no evidence of suspended solids accumulation in the bundle; all cords could move freely under the influence of the mixing air. Throughout the experiment, the modules were not subjected to a higher air flow rate for biofilm scouring.

The new MABR product can achieve, under some conditions, aeration efficiency (AE) greater than 6 kg $O_2$/kWh using air as feed, at an oxygen transfer efficiency of 60%. The target AE assumes that process air is available at the pressure of blowers typically used for fine bubble aeration in an activated sludge plant and also includes the energy used for mixing on the water side. The result is an aerobic biological treatment process that consumes, in this example, four times less energy than fine bubble aeration.

A continuous pilot treating primary effluent was run using three tanks in series of 100 L each. The tanks were equipped with an MABR module of 1.0 km of cord in each, as described above for the clean water re-aeration test (with 48 hollow fibers). Raw wastewater was pre-treated with a rotating belt sieve, of the type described above, which provided removal in place of primary clarification; the average values of MABR feed constituents were TSS=144 mg/L, COD=239 mg/L, BOD=174 mg/L and $NH_4$—N=23.7 mg/L. The pilot was operated as a hybrid MABR at a wastewater flow rate of 40 L/h, which corresponded to a total hydraulic retention time of 7.5 h. The carbon to nitrogen ratio (BOD/$NH_4$—N) of the primary effluent was 7.3 on average. A secondary clarifier was operated at a hydraulic loading rate of 0.2 m/h. The sludge retention time of the suspended mixed liquor was controlled at 7.5d, which corresponded to MLSS concentrations of 1,500-2,500 mg/L. The tanks were mixed by intermittent coarse bubble sparging air (12 s on/120 s off). Process air was supplied at a constant flow rate of 20 L/h per module and pressure of 1.55 bar absolute; the exhaust gas pressure was controlled at 1.24 bar absolute.

Figure 16:
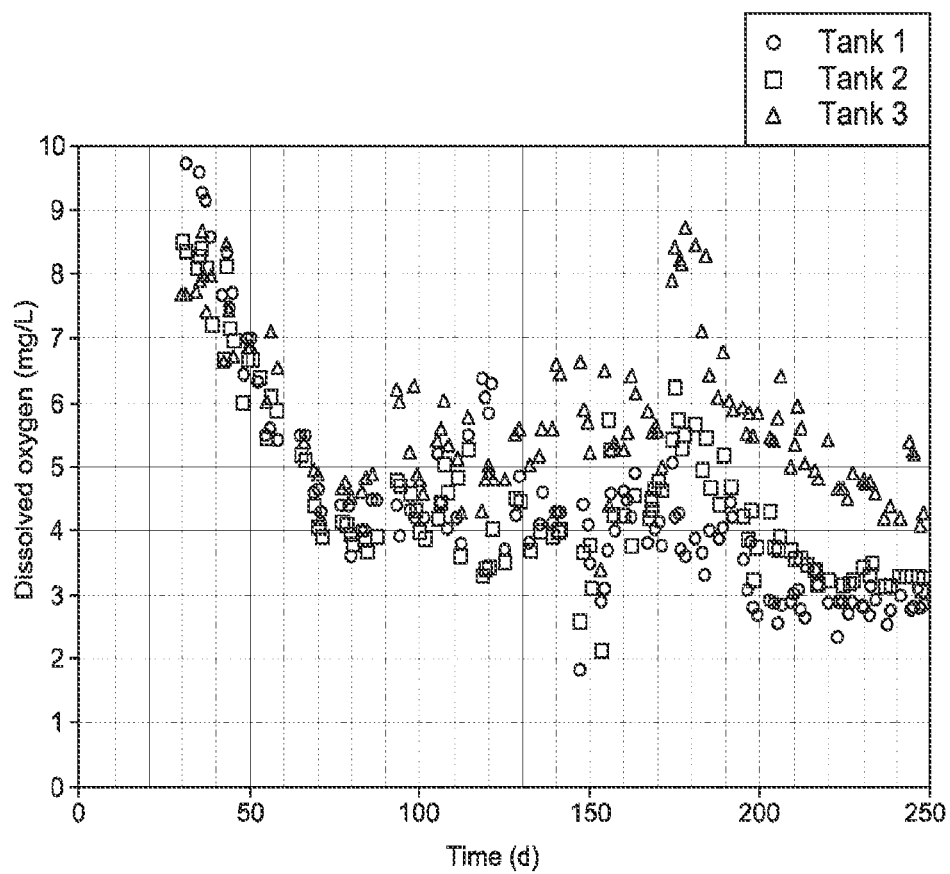
FIG. 16 contains graphs showing the dissolved oxygen concentration in a pilot plant.
Figure 16:
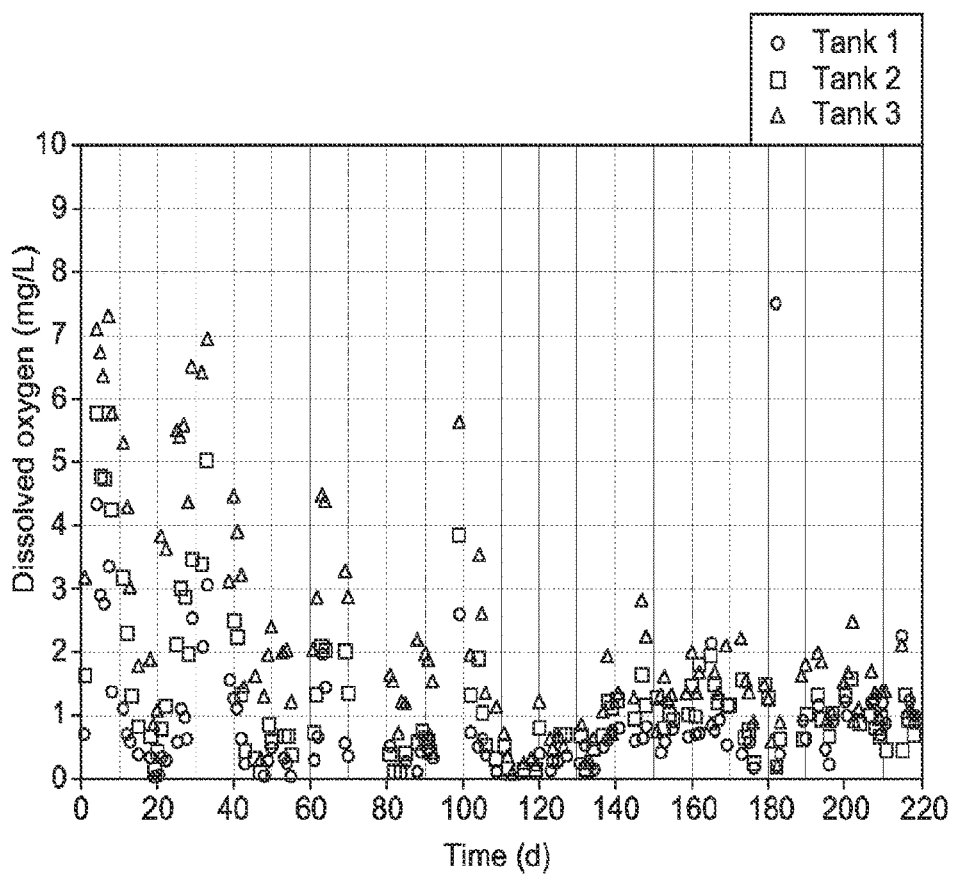

Dissolved oxygen (DO) concentrations for the continuous pilot systems are presented in FIG. 16. In each pilot experiment, the membranes were inoculated with a nitrifying biomass. In the first 30-50 days, while the biofilm was growing, oxygen was transferred to the bulk water and DO concentrations approached saturation. This is a desirable situation for start-up of the hybrid version of the process (i.e.; with a suspended biomass) since the membranes have the capability to transfer oxygen to the bulk water while the biofilm grows.

After the biofilm growth period, DO stabilized at 3-6 mg/L for the synthetic ammonia solution (described above) and less than 1 mg/L for the primary effluent. In general, DO concentration increased from Tank 1 to Tank 3, as the substrate was consumed. In the hybrid configuration (treating primary effluent), the DO was very low (less than 0.5 mg/L) and provided a favorable environment for simultaneous nitrification-denitrification, taking advantage of the presence of readily biodegradable organic carbon in the primary effluent.

Figure 17:
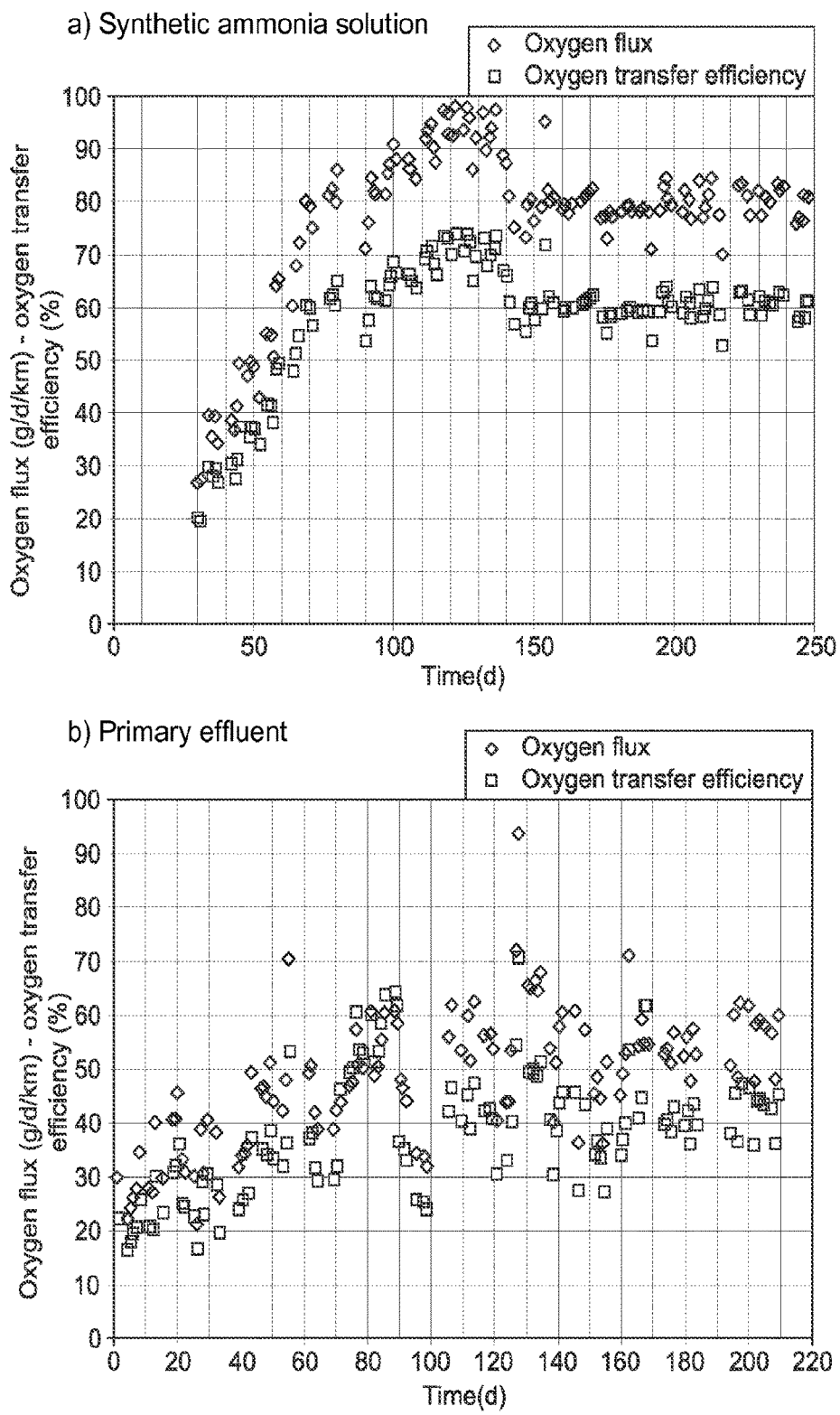
FIG. 17 contains graphs showing oxygen flux and oxygen transfer efficiency in a pilot plant.

Oxygen flux and oxygen transfer efficiency (OTE) results are presented in FIG. 17. For both feed types, fluxes increased steadily through the biofilm establishment period as the biofilm became more active and consumed dissolved oxygen close to the membrane surface (i.e.; $C_L$ in Equation 3). Higher fluxes were observed with the synthetic ammonia solution (80-90 g $O_2$/d/km) than for the primary effluent (40-60 g $O_2$/d/km). The main reason for this is likely competition from heterotrophs with the primary effluent which could have led to a thicker biofilm.

Given the fact that the MABR modules in both systems were fed at the same airflow rate (20 L/h, except for a short period as discussed below), the OTE curve follows the same pattern as the oxygen flux. OTE was 60-70% for the synthetic ammonia pilot and about 40% for the primary effluent pilot.

While it is not possible to calculate the actual driving force $(\Delta p)_{ln}$ from Equation 3 because the oxygen concentration at the surface of the membrane, $C_L$, is not known and varies dynamically, it is possible to estimate it from Equation 2. $K_{cord}$ was determined independently in the clean water re-aeration experiments and was equal to 400 g $O_2$/d/km/bar for the cord constructed with 48 hollow fibers. Using steady state values for the oxygen fluxes of 80 g $O_2$/d/km and 60 g $O_2$/d/km (FIG. 5), the driving forces $(\Delta p)_{ln}$ equal 0.20 bar and 0.15 bar, respectively for the synthetic ammonia solution and the primary effluent. What is interesting is that these different driving forces did not result from different air flow rates or pressures, but were established by the activity of the biofilm. Diffusion of substrate into the biofilm increases biological activity, which in turn reduces DO and increases oxygen flux. In other words, the biofilm "extracts" the oxygen that it needs through the membranes.

Figure 18:
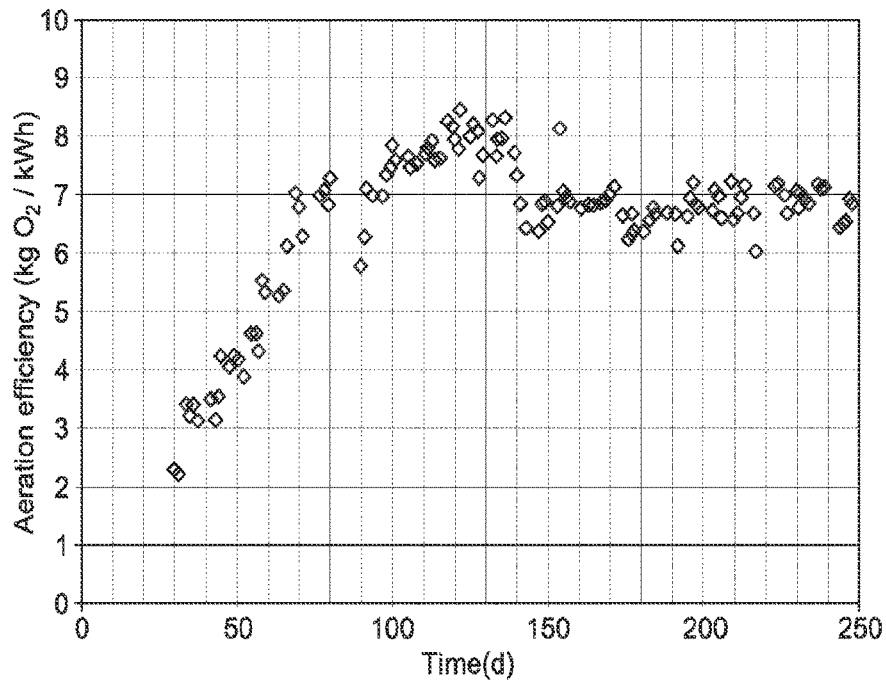
FIG. 18 contains graphs showing aeration efficiency of a pilot plant.
Figure 18:
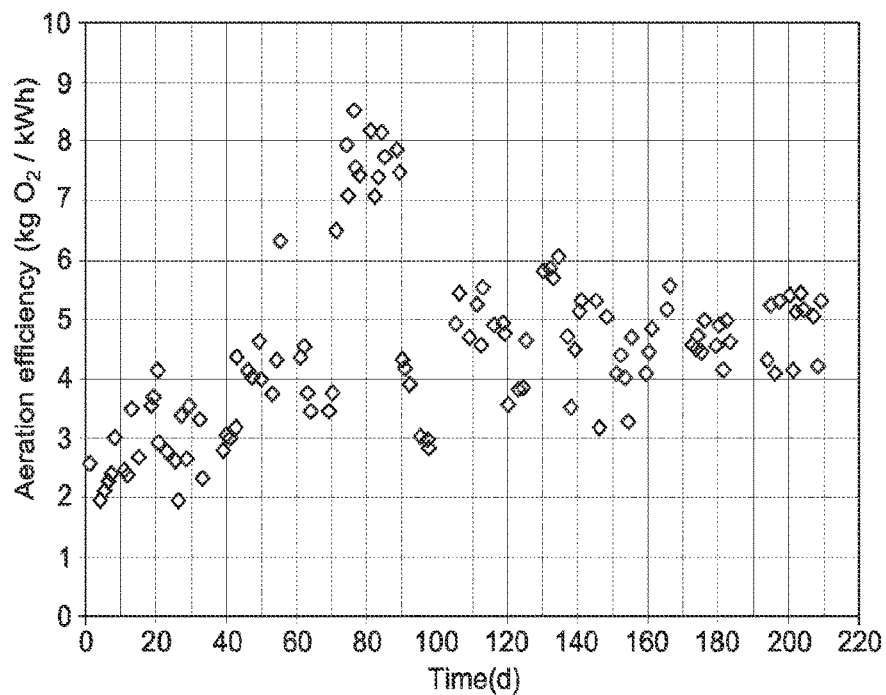

Aeration efficiency (AE) results are presented in FIG. 18. For the synthetic ammonia solution AE ranged between 7-8 kg $O_2$/kWh, reflecting the high oxygen fluxes and OTE values presented above. For the primary effluent, AE was between 4-5 kg $O_2$/kWh for most of the duration of the experiment. In both cases, AE was low during the biofilm growth period as DO build-up in the bulk liquid slowed oxygen transfer (numerator), while the energy components (pumping air through the hollow fibers and mixing the liquid by sparging) were constant (denominator).

During a short period (days 70-90) with the primary effluent pilot, the airflow rate per module was dropped from 20 L/h to 14 L/h. This change was positive as the OTE increased to 60% (FIG. 17b) and the AE to 7-8 kg $O_2$/kWh (FIG. 6b). Surprisingly, this did not affect the oxygen flux negatively (FIG. 17b), but reduced DO in the tanks which promoted better denitrification.

These tests demonstrated that the capability to deliver oxygen can be adjusted in the cord design by changing the number of hollow fibers oriented around the circumference of a yarn reinforcement.

In summary, results for two continuous pilot studies were presented. The first, using a synthetic ammonia feed solution, was run in flow-through mode to represent a tertiary nitrification application (with a C/N ratio of approximately 0.5). The second, using primary effluent, was run in a hybrid mode to represent an application where the membranes are immersed in a suspended biomass (with a C/N ratio of approximately 7.3). In both cases, the membranes transferred oxygen to the bulk during the period when the biofilm was being established.

Oxygen flux ranged between 80-90 g $O_2$/d/km for the synthetic ammonia solution and 40-60 g $O_2$/d/km for the primary effluent; the lower values observed with the primary effluent were attributed to thicker biofilm resulting from competition by heterotrophic bacteria.

It was demonstrated that the new MABR membrane cords can transfer oxygen efficiently, at an aeration efficiency greater than 6 kg $O_2$/kWh. This efficiency is approximately four times better than fine-bubble aeration.

Energy-Neutral Wastewater Treatment

In this specification, references to energy-neutral or electricity-neutral treatment represent a goal or potential attribute that might or might not be reached in any particular circumstance rather than a promise of any claimed invention. However, one or more inventions described herein provide alternative flowsheets that are at least useful for treating wastewater. The gas transfer membranes described above may be used in a membrane-aerated biofilm reactor (MABR) that is part of an energy-neutral flowsheet for municipal wastewater treatment.

The energy content of municipal wastewater is two to four times greater than the energy required to treat it. However current conventional technologies and practices do not exploit this to the full extent. As a result, the energy demand for wastewater treatment remains significant, representing 3% of the electricity demand in the United States (US EPA, 2006). It is anticipated that this demand will continue to grow globally as emerging countries improve their level of sanitation and developed countries pursue higher levels of treatment for reuse and discharge to the environment.

Meeting the objective of energy-neutral wastewater treatment can be helped by following two parallel paths: i) minimizing the energy required for the removal of solids, organics and nutrients, and ii) maximizing the conversion of organics to usable energy.

A new energy-neutral wastewater treatment flowsheet is presented in this specification. In some circumstances, the flowsheet may meet one or more of the following objectives:
1. It is "electricity-neutral". The electricity produced meets the electricity demand for treatment and useable heat is not accounted for in the energy balance. If useable heat were taken into account, the solution would be largely energy positive.
2. It is capable of nitrogen removal using the proven nitrification-denitrification metabolic pathway.
3. It does not rely on co-digestion (e.g., of food wastes) to increase energy production.
4. It has the potential to be cost-competitive with conventional activated sludge treatment.
5. It is applicable for new plants and retrofitting existing activated sludge plants.

This specification compares the new energy-neutral flowsheet to a reference conventional activated sludge (CAS) flowsheet using simulation software. Experimental work on various aspects of the new flowsheet is presented earlier in this specification.

Recent efforts in municipal wastewater treatment have been focused on the reduction of energy consumption and on the diversion of organic carbon to anaerobic digestion to produce energy through the combustion of biogas in a combined heat and power (CHP) system. Energy-neutrality has been achieved at the Strass plant in Austria, but with the addition of external organic wastes to the anaerobic digesters. Several plants in North America are pursuing an energy-neutrality goal.

The pursuit of energy-neutrality should not be achieved at the expense of effluent quality; nitrogen removal has proven particularly challenging for the technical solutions that have been proposed to-date. In general, maximizing the diversion of organic carbon to energy production does not leave enough soluble carbon for conventional nitrification-denitrification. Recent research trends have investigated alternate pathways for the removal of nitrogen in order to reduce the energy consumption for nitrogen removal and overcome the challenge of carbon limitation. The alternate pathways include nitrite shunt (i.e.: nitritation-denitritation) and de-ammonification (i.e.: partial nitritation and anaerobic ammonia oxidation through anammox bacteria). These approaches face several challenges, including:
1. Process conditions. De-ammonification is proven for side-stream treatment of ammonia-rich liquors (e.g.: anaerobic digestate), but does not appear adapted for mainstream implementation. There are many difficulties, including the low temperature of wastewater, and the suppression of nitrite oxidizing bacteria (NOB) which compete with heterotrophs and anammox bacteria for nitrite. Stinson et al (2013) listed 10 potential NOB suppression/inhibition mechanisms under investigation.
2. Process control. Conventional dissolved oxygen (DO) control is not sufficient to maintain conditions necessary for alternate nitrogen removal pathways. Online inorganic nitrogen instruments are required together with aeration cycling to control biological conditions and minimize effluent total nitrogen (Bunce et al, 2013).
3. Effluent and air emissions. These pathways are not conducive to low ammonia concentration and may leave significant amounts of nitrite in the effluent (Bunce et al, 2013). Furthermore, higher nitrite leads to increased emission of $N_2O$, a greenhouse gas with a global warming potential 300 times greater than $CO_2$ (De Clippeleir et al, 2012).

4. Cost. Maximization of carbon diversion can be expensive, especially if it is done with two suspended sludge systems (i.e., the AB process). Furthermore, Shiskowski (2013) has demonstrated that side-stream de-ammonification is not cost effective strictly based on energy savings. Finally, the impact of these new processes on operation and process control has not been evaluated and may only be feasible for large, sophisticated facilities.

Figure 13:
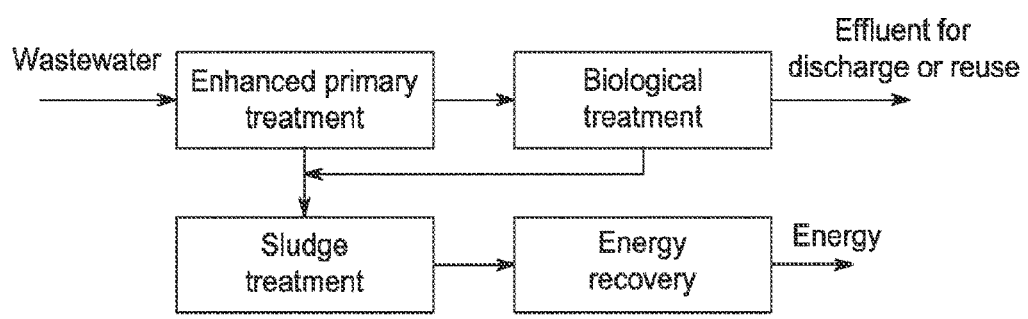
FIG. 13 is a conceptual representation of an energy-neutral flowsheet.

The proposed flowsheet to achieve energy-neutrality has four key components as shown in FIG. 13.

The first component of the new flowsheet is an enhanced primary treatment step that shunts a portion of the organic matter in raw sewage to sludge treatment. It is based on the rotating belt sieving. The objective is not necessarily to maximize removal as sufficient organic matter must be allowed to flow to the biological treatment step for nutrient removal. Process control of the technology (e.g., modulation of belt speed) allows for tuning of the organics removal, which is not possible with conventional primary clarification.

The biological treatment component of the new flowsheet is a hybrid membrane-aerated biofilm reactor (MABR) process having a membrane supported biofilm and suspended growth. An MABR product is described earlier in this specification. Hollow fiber membranes are arranged in modules and cassettes that are deployed in a way similar to immersed hollow fiber filtration membranes used for MBR (e.g.: the ZeeWeed 500 product). Atmospheric air is fed down the lumen of hollow fibers and oxygen is selectively transferred over nitrogen to the biofilm growing on the outer surface of the membrane without the formation of bubbles.

One feature of this process is a fully oxygenated nitrifying biofilm immersed into an otherwise anoxic suspended biomass. The hybrid MABR enables nitrification by the biofilm, while denitrification and COD removal are performed in the low (for example 10 days or less, 7 days or less or 5 days or less) sludge retention time (SRT) suspended-growth portion of the reactor. Organic solids that are not removed in enhanced primary treatment can flow through the biological process and end up in sludge treatment essentially un-oxidized. A secondary clarifier is used for mixed liquor retention; it can be replaced with a membrane filtration system when reuse quality water is required.

The metabolic reaction pathway for nitrogen removal proposed for the new flowsheet is proven. It is based on autotrophic nitrification and heterotrophic denitrification. This pathway is well understood as it is the result of 100 years of activated sludge evolution and has been implemented in thousands of plants around the world. The process can be controlled to achieve the most stringent total nitrogen effluent concentrations. However, this pathway, and in particular its application in a conventional suspended growth process has had major limitations that are addressed by the new hybrid MABR process proposed in this flowsheet:

1. It is energy intensive to fully oxidize ammonia to nitrate. The MABR gas transfer membrane can transfer the oxygen required for full nitrification very efficiently, i.e.: at an aeration efficiency >6.0 kg $O_2$/kWh compared to 1 to 2 kg $O_2$/kWh for fine bubble aeration (Metcalf and Eddy, 2003). The result is a 4× reduction in the energy for process aeration.

2. Nitrification by slow-growing autotrophic bacteria requires a long SRT, which translates into large tanks and expensive facilities. The nitrifying biomass is attached to the MABR membranes, which allows designing the suspended portion of the process at low SRT, and therefore small tanks.

3. When using bubble aeration, there is a fundamental competition for dissolved oxygen; complete nitrification also results in aerobic metabolization of the organic matter (COD). In the suspended growth portion of the hybrid MABR reactor, the mixed liquor is maintained under anoxic conditions to promote co-denitrification and limit the oxidation of organic matter.

4. If there is a stringent limit on total nitrogen, a carbon source may need to be added for denitrification. In the hybrid MABR process, the primary effluent COD is available for denitrification, thus eliminating or reducing supplemental carbon needs compared to conventional nitrification-denitrification processes.

The third component of the flowsheet involves using anaerobic digestion for the stabilization of primary and secondary sludges and the production of biogas. There is a strong synergy between the rotating belt sieve used for enhanced primary treatment and sludge treatment processes when the former is used for waste activated sludge (WAS) co-thickening. This concept is explored earlier in this specification.

The fourth component of the flowsheet is a combined heat and power (CHP) system that is used to convert the biogas into usable energy (electricity and heat). Alternatively, the biogas may be used for other purposes, including for example upgrading and integration into a natural gas system or upgrading to a liquid fuel. In these cases, the electricity generating capacity of the biogas removed from the system should be used in comparing a flowsheet against another flowsheet or against a goal of being energy or electricity neutral.

The new energy-neutral flowsheet was compared to a conventional activated sludge (CAS) flowsheet to evaluate the energy balance for both. The model plant had an average daily flow Q=18,925 $m^3$/d (5 MGD) with the following influent characteristics: BOD/SS/TN/TP=220/220/40/7 mg/L. It was assumed that the peak hourly flow was 2Q, the monthly loading peak was 1.35 times average and the winter design temperature was 15° C. The target effluent characteristics were BOD/SS/TN/TP=15/15/10/1.0 mg/L; both plants were designed to fully nitrify.

The unit operations of the two flowsheets are described in Table 7.

Both plants were simulated with GPS-X (Hydromantis Inc.) using default parameters to obtain treatment efficiency, sludge production and the sizing of reactors. HRT and SRT of the biological processes were adjusted to meet the target effluent characteristics stated above. Unless noted otherwise, the same model parameters in GPS-X were used to simulate the two flowsheets.

The plant design philosophy and sizing of equipment were consistent with previous work (Young et al, 2013). Electricity requirements were estimated using the methodology described in Côté et al (2013).

TABLE 7

CAS and new energy-neutral flowsheet unit operations

| Component | CAS Flowsheet | New Energy-Neutral Flowsheet |
|---|---|---|
| Primary treatment | Primary clarification | Rotating belt sieving (RBS) |
| Biological treatment | Conventional activated sludge | Hybrid MABR |
| Sludge treatment | Thickening and anaerobic digestion | Co-thickening of the WAS in the RBS and anaerobic digestion |

TABLE 7-continued

CAS and new energy-neutral flowsheet unit operations

| Component | CAS Flowsheet | New Energy-Neutral Flowsheet |
|---|---|---|
| Energy recovery | Combined heat and power system | Combined heat and power system |

Selected process modeling results for the CAS and new energy-neutral flowsheets are presented in Table 8. The overall plant electricity balance is presented in Table 9. The electricity consumption is for treatment, and does not include provision for head-works pumping. Design conditions and results are presented in this section.

Both flowsheets included identical 6 mm coarse screens with trash compactors, and grit removal chambers with grit washed/classifiers, with energy consumption of 160 and 170 kWh/d, respectively, for a total of 330 kWh/d.

The CAS flowsheet included two primary clarifiers. The removal of total suspended solids (TSS) was 60%; this corresponded to removal of BOD/COD of 37% based on partitioning of the organic matter in GPS-X. Energy consumption for the clarifier drives, the primary scum pumps and the primary sludge pumps was estimated to be 200 kWh/d.

The new energy-neutral flowsheet was designed with rotating belt sieves, specifically four LEAPprimary LP60 units available from GE Water & Process Technologies. Equivalent TSS and COD/BOD removal as for primary clarification was assumed. Energy consumption for the belt drives, the cake removal blower and the sludge compactors was estimated to be 600 kWh/d.

For both flowsheets, phosphorus was removed chemically by alum addition, at a dose of 45 kg Al/d; dosing pumps and rapid mixers had an energy consumption of 110 kWh/d. The additional chemical dosing energy for the CAS flowsheet was for methanol addition.

TABLE 8

Selected process results

| Parameter | CAS Flowsheet | New Flowsheet |
|---|---|---|
| Primary Treatment | | |
| Primary treatment | Primary clarification | Rotating belt sieve |
| TSS/COD removal in primary treatment, % | 60%/37% | 60%/37% |
| Chemical phosphorus removal | Alum | Alum |
| Biological Treatment | | |
| HRT of biological reactors, h | 12.8 | 7.7 |
| SRT of biological reactors, d | 17.0 | 5.0 |
| Mixed liquor suspended solids concentration, g/L | 3.0 | 1.8 |
| Recycle rate for nitrates (multiple of influent flow) | 4.0 Q | 0.0 Q |
| Return activated sludge (multiple of influent flow) | 1.0 Q | 0.5 Q |
| Aeration method | Fine bubble diffusers | Aeration membranes |
| Total oxygen transfer rate, kg/d | 4,300 | 3,500 |
| Carbon addition for denitrification, L/d | 450 (methanol) | Not needed |
| Sludge Treatment | | |
| Primary sludge, kg/d | 2,500 | 2,500 |
| Waste activated sludge, kg/d | 1,560 | 1,800 |
| Total sludge, kg/d | 4,060 | 4,300 |

TABLE 8-continued

Selected process results

| Parameter | CAS Flowsheet | New Flowsheet |
|---|---|---|
| Total sludge VSS/TSS | 68% | 71% |
| Total sludge TSS, g/L | 7.1% | 10.0% |
| Anaerobic digestion HRT, d | 25 | 25 |
| Anaerobic digester volume, m³ | 1,400 | 1,000 |
| Volatile solids reduction by AD, % | 59% | 64% |
| Biogas production, m³/d | 1,500 | 1,700 |
| Energy recovery | | |
| Biogas conversion to electricity, % | 35% | 35% |

The CAS flowsheet biological reactors were designed as four lines in parallel, each consisting of 2 anoxic zones and 4 aerobic zones in series. A total HRT of 12.8 h and SRT of 17 d, with a MLSS concentration of 3.0 g/L were established to achieve the effluent total nitrogen target of 10 mg/L; the addition of 450 L/d of methanol was required for denitrification. Two recycle lines were included, for nitrate (4.0Q) and return activated sludge (1.0Q). Aeration blowers were sized to deliver 3,900 Nm³/h, which allowed meeting an oxygen transfer rate (OTR) of 4,300 kg/d using fine bubble diffusers in a 5 m deep tank, using an alpha factor of 0.75. The CAS flowsheet included two secondary clarifiers.

The new flowsheet biological reactors were designed as four lines in parallel, each consisting of four hybrid MABR reactors in series. A total HRT of 7.7 hours and SRT of 5 days, with a MLSS concentration of 1.8 g/L for the suspended biomass portion were able to meet the effluent total nitrogen target of 10 mg/L without methanol addition. Each of the four MABR trains contained fifteen (15) immersed MABR cassettes as described as described previously herein. A single recycle line was included for return activated sludge (0.5Q). There is no separate nitrate recycle line. Aeration blowers were sized to deliver 1,770 Nm³/h and meet an OTR of 3,500 kg/d, at an oxygen transfer efficiency (OTE) of 64%. It should be noted that the oxygen demand is 20% lower than that for the CAS flowsheet due the lower SRT of the suspended biomass. The exhaust air from the MABR cassettes is used to renew mixed liquor and provide mixing within the cassette volume as described previously herein. However, since the cassettes only occupy 17% of the volume of the tanks, additional mechanical mixers were sized to keep the mixed liquor in suspension (using the same power input as for the anoxic zones of the CAS flowsheet). The new flowsheet included two secondary clarifiers.

For both flowsheets, the supernatant from solids dewatering was returned to the head of the biological reactors. The COD and ammonia content of these streams represented 2% and 14% of the influent load, respectively.

Figure 14:
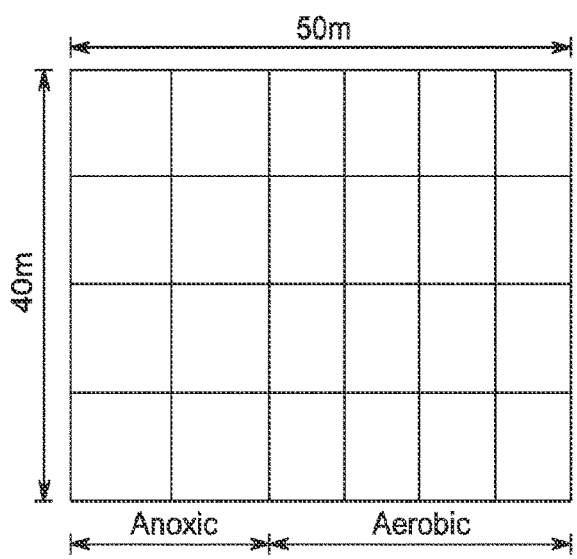
FIG. 14 is a footprint comparison of the biological treatment for CAS and New flowsheets.
Figure 14:
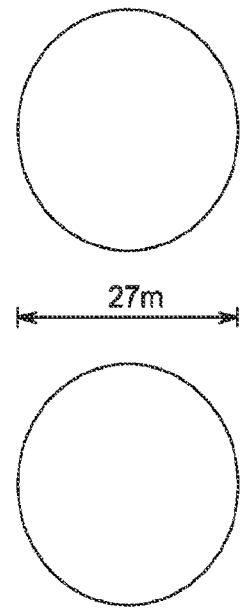
Figure 14:
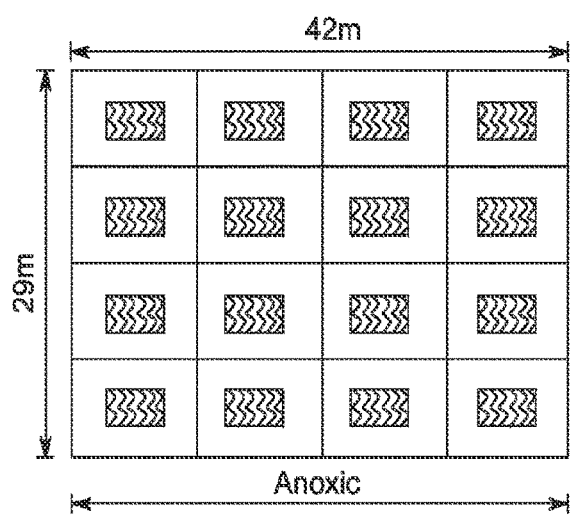
Figure 14:
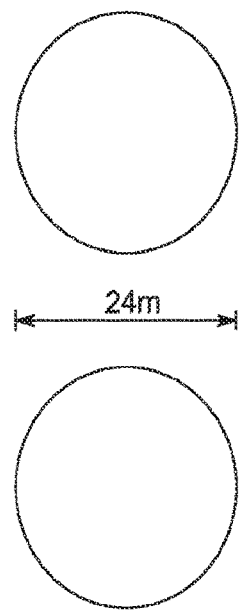

The tank arrangement and footprint for the two plants are compared in FIG. 14. The CAS plant is a classic Modified Ludzack-Ettinger (MLE) configuration with a total reactor volume of 10,000 m³ in 5 m deep tanks; the anoxic tanks were sized at approximately 40% of the total volume.

The hybrid MABR plant has a total reactor volume of 6,000 m³, also in 5 m deep tanks. Aerobic degradation (nitrification and soluble organic matter oxidation) takes place in the biofilm while denitrification happens in the bulk. The MABR membranes, once covered with a biofilm, are not efficient at delivering oxygen to the bulk mixed liquor since the biofilm represents a relatively thick diffusion layer. Therefore, the entire reactor volume is anoxic, or slightly aerobic in the downstream tanks. The footprint of the MABR biological system is approximately 40% smaller than that of the CAS system.

The blower energy consumption of the hybrid MABR biological system (490 kWh/d), is 70% lower than the CAS system (1,670 kWh/d). Energy for mechanical mixing of anoxic zones is approximately the same. Total energy for biological treatment with the IFAS-MABR system is 45% lower than the CAS system.

As stated above, it was assumed that the same amount of primary sludge was produced in the two flowsheets (2,500 kg/d) in order to facilitate the comparison of the biological treatment steps. GPS-X predicted that the CAS and hybrid MABR systems would produce 1,560 kg/d and 1,800 kg/d of waste activated sludge (WAS), respectively. The higher WAS for the new flowsheet is due to operating at lower SRT and under bulk anoxic conditions, in spite of the fact that external carbon was not added for denitrification. Overall, the new flowsheet produced 8% more bio-solids as compared to the CAS flowsheet. Furthermore, the mixed sludge from the new flowsheet had a higher organic fraction with VSS/TSS of 71% as compared to 68% for the CAS flowsheet.

Sludge thickening for the two flowsheets was handled differently. With the CAS flowsheet, the primary sludge was thickened with gravity thickeners to 8% and the WAS was thickened with rotary drums to 6%. The blended sludge had TSS of 7.1%. With the new flowsheet, the WAS was co-thickened with the primary sludge using the RBS to a blended sludge value of 10.0% as described earlier in this specification.

For both flowsheets, the mixed sludges were anaerobically digested with a hydraulic retention time of 25 days. The new flowsheet has a digester 28% smaller than the CAS flowsheet because the mixed sludge has a higher solids concentration. The volatile solids reduction in the new flowsheet was 64% and biogas production was 1,700 m$^3$/d, as compared to 59% and 1,500 m$^3$/d for the CAS flowsheet. The higher production of biogas produced in the new flowsheet (+13%) was due to the higher amount of sludge and higher volatile solids content.

The energy consumption for sludge treatment of the CAS flowsheet had 5 components: 150 kWh/d for the primary sludge gravity thickener, 50 kWh/d for the WAS rotary drum thickener, 140 kWh/d for sludge blending and holding tank mixing, 460 kWh/d for anaerobic digester gas mixing and pumping, and 200 kWh/d for the dewatering centrifuge, for a total of 1,000 kWh/d.

The energy consumption for sludge treatment of the new flowsheet had 3 components since thickening and blending were achieved by the RBS: 60 kWh/d for mixing the holding tank, 360 kWh/d for anaerobic digester gas mixing and pumping, and 200 kWh/d for the dewatering centrifuge, for a total of 620 kWh/d.

The conversion efficiency of biogas into useable energy through combined heat and power (CHP) systems is well established (US EPA, 2008). For the size range of interest in this project, reciprocating engines have an electrical power efficiency of 22-40% and an overall efficiency of 70-80%. In the electricity balance presented in Table 9, a power efficiency of 35% was used to convert biogas energy into useable electricity. Usable heat was not considered in the energy balance.

TABLE 9

Electricity balance (kWh/d)

| Parameter | CAS Flowsheet | New Flowsheet |
|---|---|---|
| Consumption | | |
| Coarse screening & grit removal | −330 | −330 |
| Primary treatment | −200 | −600 |
| Chemical dosing | −120 | −110 |
| Biological treatment blowers | −1,670 | −490 |
| Biological treatment mixers | −1,030 | −1,070 |
| Nitrate recycle | −400 | 0 |
| RAS/WAS pumping | −540 | −380 |
| Secondary clarification | −110 | −110 |
| Sludge processes | −1,000 | −620 |
| Electrical consumption | −5,400 | −3,710 |
| Specific electrical consumption (kWh/m$^3$) | −0.29 | −0.20 |
| Production | | |
| Electricity from Biogas (CHP) | 3,400 | 4,000 |
| Specific electrical production (kWh/m$^3$) | 0.18 | 0.21 |
| Net electrical balance | −2,010 | 280 |
| Net specific electrical consumption (kWh/m$^3$) | −0.11 | 0.01 |

The CAS flowsheet taken as reference in this project had a specific energy consumption of 0.29 kWh/m$^3$ (Table 3). This is low when compared to values reported by Monteith et al (2007), ranging between 0.35 and 0.65 kWh/m$^3$, for two reasons. First, our analysis considered energy for treatment only while literature numbers often include head-works pumping. Second, our analysis was based on a plant utilization factor (PUF) of 100% while many plants surveyed are not running at full capacity; conservation of the energy benefits as the PUF decreases depend on the fraction of the power input that can be turned down with the flow (variable power, e.g., aeration) versus the fraction that always runs at full capacity (base power, e.g., clarifier mechanism).

In the new energy-neutral flowsheet, electricity neutrality was achieved through a combination of significant savings in biological treatment (−45%) and enhanced biogas production (+18%). A large portion of the savings are due to more efficient oxygen transfer (−1,180 kWh/d), but also to elimination of nitrate recycling (−400 kWh/d) and running at a lower return activated sludge rate (−160 kWh/d). The gains with biogas production are attributed to diverting more organics to anaerobic digestion (+240 kg/d); furthermore, the feed sludge had a higher fraction of volatile solids (+3%).

The MABR allowed very high oxygen transfer efficiency (>60%) and aeration efficiency (>6.0 kg O$_2$/kWh), while working with a low SRT suspended biomass that allowed shunting more sludge to energy production. In a CAS system, oxygen transfer efficiency and shunting biomass are incompatible objectives. Rosso et al (2005) showed the alpha factor and the standard oxygen transfer efficiency dramatically dropped at SRT less than 5 days.

A detailed cost analysis of flowsheets containing MABR in comparison with CAS was performed by Aybar et al (2012) with CapdetWorks (Hydromantis, Inc.). This analysis showed that the MABR-containing flowsheets have much lower energy consumption as compared to CAS flowsheets and that their cost effectiveness is sensitive to membrane-related factors, including membrane costs, mixing energy requirements and lifetime of membranes.

While the cost of the new energy-neutral flowsheet introduced in this paper has not been fully evaluated in comparison to a CAS flowsheet, it is recognized that deployment of MABR membranes will have a cost. However, the modelling and design work reported above identifies several opportunities for capital cost reduction for the new hybrid MABR as compared to a CAS process:

Reduction of the size of the biological reactors (40%)
Elimination of fine bubble diffusers
Reduction of the size of blowers (70%)
Elimination of the nitrate recycle stream
Elimination of the external carbon dosing system
Reduction of the plant footprint (40%)

Furthermore, the new flowsheet would reduce O&M costs by making the plant electricity-neutral and eliminating the need for external carbon addition for denitrification.

In the proposed new flowsheet, additional capital and O&M cost benefits are provided by the replacement of primary clarifiers with rotating belts sieves; these benefits are discussed earlier in this specification.

Energy-neutral wastewater treatment is an important goal, but it should not be achieved at the expense of effluent quality or plant operability. A new flowsheet is proposed based on a hybrid membrane-aerated biofilm reactor (MABR) process. This new flowsheet achieves energy-neutrality (even better, electricity-neutrality) while removing nitrogen using the proven nitrification-denitrification metabolic pathway. Furthermore, it is compatible with solid-liquid separation by conventional clarification or membrane filtration.

The hybrid MABR biological process is based on two sludges, one fixed and one suspended. Since oxygen is not transferred through bubbles, oxidation reactions for nitrification and BOD removal can take place in an otherwise anoxic reactor. Maximizing diversion of organic matter through primary treatment (or an A-Stage) is not critical to achieving energy-neutrality because suspended and colloidal solids can pass through the MABR reactor without undergoing significant oxidation. The suspended biomass is managed at a low SRT and the organics can be sent to anaerobic digestion through the waste activated sludge. Furthermore, denitrification using the influent COD is enhanced.

The new energy-neutral flowsheet was compared to a conventional activated sludge (CAS) flowsheet using a wastewater treatment simulator (GPS-X from Hydromantis Inc.). Both flowsheets included complete wastewater and sludge treatment with anaerobic digestion and combined heat and power (CHP) production. The CAS flowsheet had a specific electricity consumption of 0.29 kWh/m$^3$ while the new flowsheet had 0.20 kWh/m$^3$, a reduction of about 30%. Electricity produced through the CHP system was 0.18 kWh/m$^3$ for the CAS flowsheet and 0.21 kWh/m$^3$ for the new flowsheet, an increase of 18%. Overall, the new flowsheet was electricity-neutral.

Experimental validation of the new flowsheet is in progress. As described herein, initial piloting results support the oxygen transfer efficiency and nitrification capacity of the new MABR membrane, and the synergistic use of rotating belt sieves for primary treatment.

Retrofit of a Conventional Activated Sludge Plant

The MABR device described herein can also be used to modify a conventional activated sludge design, or to retrofit an existing activated sludge plant. The addition of the MABR to a process tank can improve the nitrogen removal capability of an existing plant or design, or increase the flow rate of an existing design or plant, or allow for nitrogen to be removed at lower temperature.

Optionally, to minimize the need to modify civil works, the frame of the MABR device can be fitted with one or more floats (for example a hollow tube on each side of the frame) and positioned in plan view by cables, whips, levers or other devices to the top or side of a tank. In this way, the MABR device floats with the membranes located below the surface of the water, optionally rising and falling with the water level. In the event that the plant does not have fine screening, fine screens or RBS primary treatment may be added upstream of a process tank containing the MABR device. Alternatively, fine screens maybe attached to the frame of the MABR device such that the membranes are confined within the screens.

In an example, a conventional activated sludge plant or design has an aerobic tank but does not provide significant nitrogen removal. Nitrogen removal was not previously required in many jurisdictions, but there is a regulatory trend towards requiring effluent to be below specified concentrations of total nitrogen and/or ammonia. Often an activated sludge plant built prior to nitrogen regulation will have a single tank with insufficient size and SRT to remove nitrogen. A conventional upgrade to remove nitrogen involves adding an anoxic tank upstream of the aerobic tank but this requires additional land and civil works.

Using an MABR device as described herein (i.e. a cassette of modules containing gas transfer cords), the plant or design is modified by operating the formerly aerobic tank under anoxic or slightly aerobic conditions but adding one or more MABR devices to the tank. The MABR device provides a biofilm that is at least partially aerobic. Effluent from the MABR tank is separated, typically in a downstream clarifier or separation membrane, with RAS returned to the MABR tank and WAS removed. An internal nitrate recycle loop is not required. A low sludge retention time (SRT) of 10 days or less, optionally 7 days or less or 5 days or less, may be used. In some cases, this will be a reduction in a previously used or designed SRT and allow an increase in the flow rate through the plant.

Optionally, the MABR devices may be added in a first part of the former aeration basin only, with the rest of the aeration basin operated conventionally but with reduced air flow at some times. This allows an increase in peak capacity or the ability to nitrify at low temperatures or both. During peak flow, the conventional part of the aeration basin may be operated as in a conventional aerobic suspended growth process. When the plant is operating below peak conditions, for example near average day conditions, the aeration rate in the conventional part of the basin can be turned down to reduce energy consumption.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

INCORPORATION OF RELATED APPLICATIONS

The following applications are incorporated by reference: PCT/US2013/027435, Membrane Assembly for Supporting a Biofilm, filed by General Electric Company on Feb. 22, 2013, published as WO 2014/130043 A1; PCT/US2013/

027411, Wastewater Treatment with Membrane Aerated Biofilm and Anaerobic Digester, filed by General Electric Company on Feb. 22, 2013, published as WO 2014/130042; PCT/US2013/027403, Micro-Sieve Separation and COD Diversion in Wastewater Treatment, filed by General Electric Company on Feb. 22, 2013, published as WO 2014/130041 A1; and, U.S. application Ser. No. 13/686,160, Method and System for Treating Wastewater, filed by General Electric Company on Nov. 27, 2012, published as US 2013/0134089 A1.

We claim:

1. A process comprising the steps of,
   a) immersing a gas transfer membrane in water;
   b) flowing pressurized air into the gas transfer membrane;
   c) withdrawing an exhaust gas from the gas transfer membrane; and,
   d) producing bubbles comprising the exhaust gas from an aerator immersed in the water,
      wherein the exhaust gas has a pressure larger than the static head of water above the aerator.

2. The process of claim 1 wherein the exhaust gas is supplied to the aerator without increasing the pressure of the exhaust gas.

3. The process of claim 1 further comprising supporting a biofilm on the gas transfer membrane and transferring oxygen to the biofilm.

4. The process of claim 1 further comprising a step of providing a suspended biomass in the water.

5. The process of claim 1, wherein the water is anoxic or aerobic.

6. The process of claim 1, wherein in step d) the bubbles are produced for 0.5 to 20 seconds at least once every 200 seconds or for 0.5 to 3 seconds at least once every 20 seconds.

7. An apparatus comprising,
   a first header,
   a second header,
   a plurality of gas transfer membranes extending between the headers,
   a gas inlet to the first header,
   a gas outlet from the second header, and
   an aerator connected to the gas outlet and located between or below the gas transfer membranes.

8. The apparatus of claim 7, wherein the aerator comprises a transducer configured to release bursts of bubbles.

* * * * *